(12) United States Patent
Manifold et al.

(10) Patent No.: US 10,933,577 B2
(45) Date of Patent: Mar. 2, 2021

(54) UNITARY DEFLECTION MEMBER FOR MAKING FIBROUS STRUCTURES HAVING INCREASED SURFACE AREA AND PROCESS FOR MAKING SAME

(71) Applicant: The Procter & Gamble Company, Cincinnati, OH (US)

(72) Inventors: John Allen Manifold, Sunman, IN (US); John Leslie Brent, Jr., Springboro, OH (US); James Michael Singer, Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 556 days.

(21) Appl. No.: 15/132,295

(22) Filed: Apr. 19, 2016

(65) Prior Publication Data

US 2016/0354979 A1 Dec. 8, 2016

Related U.S. Application Data

(60) Provisional application No. 62/155,524, filed on May 1, 2015.

(51) Int. Cl.
 *B29C 64/118* (2017.01)
 *D21F 7/08* (2006.01)
 (Continued)

(52) U.S. Cl.
 CPC ......... *B29C 64/118* (2017.08); *B29C 64/112* (2017.08); *B33Y 80/00* (2014.12);
 (Continued)

(58) Field of Classification Search
 None
 See application file for complete search history.

(56) References Cited

U.S. PATENT DOCUMENTS 3,034,180 A 5/1962 Greiner et al.
3,322,617 A 5/1967 Osborne
(Continued)

FOREIGN PATENT DOCUMENTS

EP 2123826 A2 5/2009
WO WO 2003/82550 A2 10/2003
(Continued)

OTHER PUBLICATIONS

PCT International Search Report dated Jul. 12, 2016 from related case 13832—4 pages.
(Continued)

*Primary Examiner* — Monica A Huson
*Assistant Examiner* — Kelsey C Grace
(74) *Attorney, Agent, or Firm* — Richard L. Alexander; Andrew J. Mueller

(57) ABSTRACT

A unitary deflection member and a method for making a unitary deflection member is disclosed. The method can include the steps of: providing an additive manufacturing making apparatus; providing a material for the unitary deflection member, the material being compatible for use with the additive manufacturing making apparatus; generating a 3-D digital image of objects in a repeat element of the unitary deflection member, the objects including at least a reinforcing member and at least one protuberance of the unitary deflection member; assembling the objects into a digitized file including the at least one protuberance being on said reinforcing member; importing the digitized file to make numerical control file; and depositing the material using the additive manufacturing making apparatus to make the unitary deflection member.

17 Claims, 14 Drawing Sheets

(51) Int. Cl.
  *B33Y 80/00* (2015.01)
  *D04H 1/425* (2012.01)
  *B29C 64/112* (2017.01)
  *D04H 1/76* (2012.01)
  *D04H 1/732* (2012.01)
  *D21F 1/00* (2006.01)
  *D21F 11/00* (2006.01)
  *B33Y 10/00* (2015.01)
  *B33Y 50/00* (2015.01)

(52) U.S. Cl.
  CPC ............. *D04H 1/425* (2013.01); *D04H 1/732* (2013.01); *D04H 1/76* (2013.01); *D21F 1/009* (2013.01); *D21F 7/086* (2013.01); *D21F 11/006* (2013.01); *B33Y 10/00* (2014.12); *B33Y 50/00* (2014.12)

(56) References Cited

U.S. PATENT DOCUMENTS

| | | | |
|---|---|---|---|
| 4,528,239 A | | 7/1985 | Trokhan |
| 4,537,658 A | | 8/1985 | Albert |
| 4,828,563 A | * | 5/1989 | Muller-Lierheim ........................ A61L 27/227 623/23.63 |
| 4,842,905 A | | 6/1989 | Stech |
| 5,104,592 A | * | 4/1992 | Hull ..................... B29C 64/135 264/401 |
| 5,527,428 A | | 6/1996 | Trokhan et al. |
| 5,658,334 A | * | 8/1997 | Caldarise ................. B22C 7/02 128/898 |
| 5,714,041 A | | 2/1998 | Ayers et al. |
| 5,893,965 A | * | 4/1999 | Trokhan ............... D21F 11/006 162/111 |
| 5,900,122 A | | 5/1999 | Huston |
| 5,948,210 A | | 9/1999 | Huston |
| 6,074,525 A | | 6/2000 | Richards |
| 6,126,784 A | | 10/2000 | Ficke et al. |
| 6,171,447 B1 | | 1/2001 | Trokhan |
| 6,402,895 B1 | | 6/2002 | Best |
| 6,420,100 B1 | | 7/2002 | Trokhan et al. |
| 6,514,382 B1 | | 2/2003 | Kakiuchi et al. |
| 6,576,090 B1 | | 6/2003 | Trokhan et al. |
| 6,576,091 B1 | * | 6/2003 | Cabell .................. D21F 11/006 162/116 |
| 6,660,362 B1 | | 9/2003 | Lindsay et al. |
| 6,660,129 B1 | | 12/2003 | Cabell et al. |
| 6,878,238 B2 | | 4/2005 | Bakken et al. |
| 7,005,043 B2 | | 2/2006 | Toney et al. |
| 7,014,735 B2 | | 3/2006 | Kramer et al. |
| 7,005,044 B2 | | 4/2006 | Kramer et al. |
| 7,105,465 B2 | | 9/2006 | Patel et al. |
| 7,118,647 B2 | | 10/2006 | Cabell et al. |
| 7,384,588 B2 | | 6/2008 | Gordon et al. |
| 7,799,382 B2 | | 9/2010 | Payne et al. |
| 8,216,427 B2 | | 7/2012 | Klerelid et al. |
| 8,454,800 B2 | | 6/2013 | Mourad et al. |
| 8,470,133 B2 | | 6/2013 | Cunnane et al. |
| 8,758,569 B2 | | 6/2014 | Aberg et al. |
| 8,801,903 B2 | | 8/2014 | Mourad et al. |
| 8,815,057 B2 | | 8/2014 | Eberhardt et al. |
| 8,822,009 B2 | | 9/2014 | Riviere et al. |
| 9,005,710 B2 | | 4/2015 | Jones et al. |
| 9,926,667 B2 | | 3/2018 | Manifold et al. |
| 9,938,666 B2 | | 4/2018 | Manifold et al. |
| 9,976,261 B2 | | 5/2018 | Manifold et al. |
| 10,214,856 B2 | | 2/2019 | Manifold et al. |
| 10,233,593 B2 | | 3/2019 | Manifold et al. |
| 10,240,298 B2 | | 3/2019 | Manifold et al. |
| 10,385,509 B2 | | 8/2019 | Manifold et al. |
| 10,465,340 B2 | | 11/2019 | Manifold et al. |
| 10,577,722 B2 | | 3/2020 | Ashraf et al. |
| 2004/0065421 A1 | | 4/2004 | Cabell et al. |
| 2004/0109972 A1 | | 6/2004 | Baker |
| 2004/0126710 A1 | | 7/2004 | Hill et al. |
| 2004/0154763 A1 | | 8/2004 | Polat et al. |
| 2005/0123726 A1 | | 6/2005 | Broering et al. |
| 2005/0280184 A1 | | 11/2005 | Sayers et al. |
| 2006/0019567 A1 | | 1/2006 | Sayers |
| 2006/0061016 A1 | | 3/2006 | Gordon et al. |
| 2006/0127641 A1 | | 6/2006 | Barnholtz et al. |
| 2006/0278298 A1 | | 12/2006 | Ampulski et al. |
| 2007/0116928 A1 | | 5/2007 | Monnerie et al. |
| 2007/0137814 A1 | | 6/2007 | Gao |
| 2007/0170610 A1 | | 7/2007 | Payne et al. |
| 2008/0199655 A1 | | 8/2008 | Monnerie et al. |
| 2008/0245498 A1 | | 10/2008 | Ostendorf et al. |
| 2010/0119779 A1 | | 5/2010 | Ostendorf et al. |
| 2011/0265967 A1 | | 11/2011 | Van Phan |
| 2012/0043036 A1 | | 2/2012 | Polat et al. |
| 2013/0287933 A1 | * | 10/2013 | Kaiser .................. B29C 64/386 427/9 |
| 2013/0319625 A1 | | 12/2013 | Mohammadi et al. |
| 2014/0004307 A1 | | 1/2014 | Sheehan |
| 2014/0272269 A1 | | 9/2014 | Hensen |
| 2015/0102526 A1 | | 4/2015 | Ward et al. |
| 2016/0060811 A1 | | 3/2016 | Riding et al. |
| 2016/0090692 A1 | | 3/2016 | Eagles et al. |
| 2016/0090693 A1 | | 3/2016 | Eagles et al. |
| 2016/0159007 A1 | | 6/2016 | Miller et al. |
| 2016/0185041 A1 | | 6/2016 | Lisagor et al. |
| 2016/0185050 A1 | | 6/2016 | Topolkaraev et al. |
| 2016/0319483 A1 | | 11/2016 | Manifold et al. |
| 2016/0355988 A1 | | 12/2016 | Manifold et al. |
| 2016/0369452 A1 | | 12/2016 | Manifold et al. |
| 2017/0275821 A1 | | 9/2017 | Manifold et al. |
| 2017/0275822 A1 | | 9/2017 | Manifold et al. |
| 2018/0119347 A1 | | 5/2018 | Brent et al. |
| 2018/0119348 A1 | | 5/2018 | Brent et al. |
| 2018/0119350 A1 | | 5/2018 | Brent et al. |
| 2018/0119351 A1 | | 5/2018 | Brent et al. |
| 2018/0119354 A1 | | 5/2018 | Brent et al. |
| 2018/0216293 A1 | | 8/2018 | Manifold et al. |
| 2018/0230656 A1 | | 8/2018 | Manifold et al. |
| 2018/0237991 A1 | | 8/2018 | Manifold et al. |
| 2019/0003079 A1 | | 1/2019 | Ashraf et al. |
| 2019/0038080 A1 | | 1/2019 | Ashraf et al. |
| 2019/0127913 A1 | | 5/2019 | Sheehan |
| 2019/0161912 A1 | | 5/2019 | Manifold |
| 2019/0161917 A1 | | 5/2019 | Manifold et al. |
| 2019/0330794 A1 | | 10/2019 | Dao et al. |
| 2019/0330799 A1 | | 10/2019 | Manifold |
| 2019/0330800 A1 | | 10/2019 | Manifold |
| 2020/0149191 A1 | | 5/2020 | Ashraf et al. |

FOREIGN PATENT DOCUMENTS

| | | |
|---|---|---|
| WO | WO 2004/45834 A1 | 6/2004 |
| WO | WO 2015/00755 A1 | 1/2015 |
| WO | WO 2016/085704 A1 | 6/2016 |

OTHER PUBLICATIONS

PCT International Search Report dated Aug. 9, 2016—4 pages.
All Office Actions U.S. Appl. No. 15/132,291.
All Office Actions U.S. Appl. No. 15/132,293.
PCT International Search Report dated Jul. 12, 2016—4 pages.
PCT International Search Report dated Aug. 19, 2016—5 pages.
PCT International Search Report dated May 29, 2017—4 pages.
PCT International Search Report dated Jan. 18, 2018—5 pages.
All Office Actions U.S. Appl. No. 15/910,062.
All Office Actions U.S. Appl. No. 15/947,89.
All Office Actions U.S. Appl. No. 16/264,857.
All Office Actions U.S. Appl. No. 15/180,211.
All Office Actions U.S. Appl. No. 15/892,508.
All Office Actions U.S. Appl. No. 15/462,949.
All Office Actions U.S. Appl. No. 15/462,940.
All Office Actions for U.S. Appl. No. 16/263,306.
All Office Actions U.S. Appl. No. 15/794,025.
All Office Actions U.S. Appl. No. 15/794,026.

(56) References Cited

OTHER PUBLICATIONS

All Office Actions U.S. Appl. No. 15/794,027.
All Office Actions U.S. Appl. No. 15/795,329.
All Office Actions U.S. Appl. No. 15/795,339.
U.S. Appl. No. 16/264,857, filed Feb. 1, 2019, Manifold et al.
U.S. Appl. No. 16/263,306, filed Jan. 31, 2019, Manifold et al.
International Search Report and Written Opinion.
All Office Actions U.S. Appl. No. 16/503,796.
All Office Actions U.S. Appl. No. 16/503,749.
All Office Actions U.S. Appl. No. 16/866,914.
All Office Actions U.S. Appl. No. 15/796,067.
U.S. Appl. No. 15/132,291, filed Apr. 19, 2016, John Allen Manifold John Leslie Brent, Jr. James Michael Singer.
U.S. Appl. No. 15/132,293, filed Apr. 19, 2016, John Allen Manifold John Leslie Brent, Jr. James Michael Singer.

\* cited by examiner

UNITARY DEFLECTION MEMBER FOR MAKING FIBROUS STRUCTURES HAVING INCREASED SURFACE AREA AND PROCESS FOR MAKING SAME

FIELD OF THE INVENTION

The present invention is related to deflection members for making strong, soft, absorbent fibrous webs, such as, for example, paper webs. More particularly, this invention is concerned with structured fibrous webs, equipment used to make such structured fibrous webs, and processes therefor.

BACKGROUND OF THE INVENTION

Products made from a fibrous web are used for a variety of purposes. For example, paper towels, facial tissues, toilet tissues, napkins, and the like are in constant use in modern industrialized societies. The large demand for such paper products has created a demand for improved versions of the products. If the paper products such as paper towels, facial tissues, napkins, toilet tissues, mop heads, and the like are to perform their intended tasks and to find wide acceptance, they must possess certain physical characteristics.

Among the more important of these characteristics are strength, softness, absorbency, and cleaning ability. Strength is the ability of a paper web to retain its physical integrity during use. Softness is the pleasing tactile sensation consumers perceive when they use the paper for its intended purposes. Absorbency is the characteristic of the paper that allows the paper to take up and retain fluids, particularly water and aqueous solutions and suspensions. Important not only is the absolute quantity of fluid a given amount of paper will hold, but also the rate at which the paper will absorb the fluid. Cleaning ability refers to a fibrous structures' capacity to remove and/or retain soil, dirt, or body fluids from a surface, such as a kitchen counter, or body part, such as the face or hands of a user.

Through-air drying papermaking belts comprising a reinforcing element and a resinous framework, and/or fibrous webs made using these belts are known and described, for example, in the following commonly assigned U.S. Pat. No. 4,528,239, issued Jul. 9, 1985 to Trokhan. Trokhan teaches a belt in which the resinous framework is joined to the fluid-permeable reinforcing element (such as, for example, a woven structure, or a felt). The resinous framework may be continuous, semi-continuous, comprise a plurality of discrete protuberances, or any combination thereof. The resinous framework extends outwardly from the reinforcing element to form a web-side of the belt (i. e., the surface upon which the web is disposed during a papermaking process), a backside opposite to the web-side, and deflection conduits extending therebetween. The deflection conduits provide spaces into which papermaking fibers deflect under application of a pressure differential during a papermaking process. Because of this quality, such papermaking belts are also known in the art as "deflection members." The terms "papermaking belt" and "deflection member" may be used herein interchangeably.

Papers produced on deflection members disclosed in Trokhan are generally characterized by having at least two physically distinct regions: a region having a first elevation and typically having a relatively high density, and a region extending from the first region to a second elevation and typically having a relatively low density. The first region is typically formed from the fibers that have not been deflected into the deflection conduits, and the second region is typically formed from the fibers deflected into the deflection conduits of the deflection member. The papers made using the belts having a continuous resinous framework and a plurality of discrete deflection conduits dispersed therethrough comprise a continuous high-density network region and a plurality of discrete low-density pillows (or domes), dispersed throughout, separated by, and extending from the network region. The continuous high-density network region is designed primarily to provide strength, while the plurality of the low-density pillows is designed primarily to provide softness and absorbency. Such belts have been used to produce commercially successful products, such as, for example, BOUNTY® paper towels, and CHARMIN® toilet tissue, all produced and sold by the instant assignee.

Typically, certain aspects of absorbency of a fibrous structure are highly dependent on its surface area. That is, for a given fibrous web (including a fiber composition, basis weight, etc.), the greater the web's surface area the higher the web's absorbency and, for certain structured webs, cleaning ability. In the structured webs, the low-density pillows, dispersed throughout the web, increase the web's surface area, thereby increasing the web's absorbency. The three-dimensionality of the structured web can improve the web's cleaning ability by providing increased scrubbing surfaces. However, increasing the web's surface area by increasing the area comprising the relatively low-density pillows would result in decreasing the web's area comprising the relatively high-density network area that imparts the strength. That is, increasing a ratio of the area comprising pillows relative to the area comprising the network would negatively affect the strength of the paper, because the pillows have a relatively low intrinsic strength compared to the network regions. Therefore, it would be highly desirable to minimize the trade-off between the surface area of the high-density network region primarily providing strength, and the surface area of the low-density region primarily providing softness and absorbency.

An improvement on deflection members to be used as papermaking belts to provide paper having increased surface area is disclosed in commonly assigned U.S. Pat. No. 6,660,129, issued Dec. 9, 2003 to Cabell et al. The disclosure of Cabell et al. teaches a deflection member that increases surface area by creating a fibrous structure wherein the second region comprises fibrous domes and fibrous cantilever portions laterally extending from the domes. The fibrous cantilever portions increase the surface area of the second region and form, in some embodiments, pockets comprising substantially void spaces between the fibrous cantilever portions and the first region. These pockets are capable of receiving additional amounts of liquid and thus further increase absorbency of the fibrous structure.

Further, Cabell et al. teaches processes for making such deflection members via a modification of the process taught by Trokhan. In one aspect, the deflection member comprises a multi-layer framework formed by at least two UV-cured layers joined together in a face-to-face relationship, and the framework is joined to a reinforcing element. Each of the layers has a deflection conduit portion. The deflection conduit portion of one layer is fluid-permeable and positioned such that portions of that layer correspond to the deflection conduits of the other layer and thus comprise a plurality of suspended portions. Cabell et al. teaches making the deflection member by curing a coating of a curable material through a mask comprising opaque regions and transparent regions and a three-dimensional topography.

However, the deflection member and process of Cabell et al. has the drawback of being unable to achieve uniform patterns of cantilevered portions. That is, the shape, size and distribution of discrete protuberances having cantilevered portions is randomly determined. This is because the use of a mask and UV-curable resins imposes certain inherent limitations on the topography of the framework that can be joined to a reinforcing member, including the shape, size and distribution of discrete protuberances. Specifically, the topography of the framework of the deflection member is dictated by the mask (or masks, in a two-layer version), and therefore the choice of topographies for the deflection member is limited to those for which a suitable mask can be produced.

Efforts at improving masks to provide broader choices in UV-curing and joining the framework to the reinforcing member are ongoing, and include, for example, the technological approach described in co-pending U.S. Provisional Application 62/076,036, entitled Mask and Papermaking Belt Made Therefrom, filed by Seger et al. on Nov. 6, 2014. Seger et al. teaches a three-dimensional mask that permits certain improvements in mask design to permit greater design freedom for non-random, discrete protuberances for making paper structures having increased surface area. The surface area is produced in deflection conduits that are non-randomly achieved, that is, the mask is designed such that a pattern of non-random shapes, sizes, and distribution of protuberances on the deflection member can be achieved.

However, the deflection member of Seger et al. is not designed to produce fibrous structures described in Cabell et al. as cantilevered portions. That is, while Seger et al. can produce novel structures for protuberances that are non-random with respect to shape, size, and distribution, the novel structures do not appear to produce cantilevered structures useful for increasing absorbency and cleaning ability of fibrous structures made thereon.

Accordingly, there is an unmet need for a deflection member having a three-dimensional topography unachievable by technology that relies on UV-curing a framework to be joined to a reinforcing member.

Further, there is an unmet need for fibrous structures such as sanitary tissue paper products having a three-dimensional structure unachievable with current deflection conduits having a topography made by technology that relies on UV-curing a framework to be joined to a reinforcing member.

Additionally, there is an unmet need for a method for making a deflection member having a three-dimensional topography unachievable by technology that relies on UV-curing a framework to be joined to a reinforcing member.

Additionally, there is an unmet need for a unitary deflection member having a similar structure to those made by UV-curing a framework to be joined to a reinforcing member.

Additionally, there is an unmet need for a deflection member having a pattern of regularly oriented and sized deflection members having protuberances with cantilevered structures.

Additionally, there is an unmet need for a deflection member having protuberances with cantilevered structures, the protuberances of each being made according to a predetermined design with respect to shape, size and distribution.

SUMMARY OF THE INVENTION

A unitary deflection member and a method for making a unitary deflection member is disclosed. The method can include the steps of: providing an additive manufacturing making apparatus; providing a material for the unitary deflection member, the material being compatible for use with the additive manufacturing making apparatus; generating a 3-D digital image of objects in a repeat element of the unitary deflection member, the objects including at least a reinforcing member and at least one protuberance of the unitary deflection member; assembling the objects into a digitized file including the at least one protuberance being on said reinforcing member; importing the digitized file to make numerical control file; and depositing the material using the additive manufacturing making apparatus to make the unitary deflection member.

DETAILED DESCRIPTION OF THE INVENTION

Unitary Deflection Member

The deflection member of the present invention can be a unitary structure manufactured by additive manufacturing processes, including what is commonly described as "3-D printing." As such, the unitary deflection member is not achieved by the use of a mask and UV-curable resin, as taught in the aforementioned U.S. Pat. No. 4,528,239 in which a resin and a reinforcing member are provided as separate parts and joined as separate components in a non-unitary manner. However, because structurally the unitary deflection member resembles deflection members in which a resinous framework is UV-cured to join a reinforcing member and used in a papermaking process, it will be described in these terms. That is, a portion of the unitary deflection member of the present invention will be described as the "reinforcing member" or "reinforcing member portion" and a portion will be described as a "patterned framework" or "framework portion," having "protuberances". The term "deflection member" as used herein refers to a structure useful for making fibrous webs such as absorbent paper products, but which has protuberances that define deflection conduits not formed by any underlying woven or grid structure. To be clear, woven papermaking fabrics, or papermaking fabrics based on a weave design, and papermaking fabrics which present no features not present in a weave pattern, are not deflection members as used in the instant disclosure.

By "unitary" as used herein is meant that the deflection member does not constitute a unit comprised of previously separate components joined together. Unitary can mean that all the portions described herein are formed as a single unit, and not as separate parts being joined to form a unit. Deflection members as described herein can be manufactured in a process of additive manufacturing such that they are unitary, as contrasted by processes in which deflection members are manufactured joining together or otherwise modifying separate components. A unitary deflection member may comprise different features and different materials for the different features, such as the patterned framework and a reinforcing member as described below.

Figure 1:
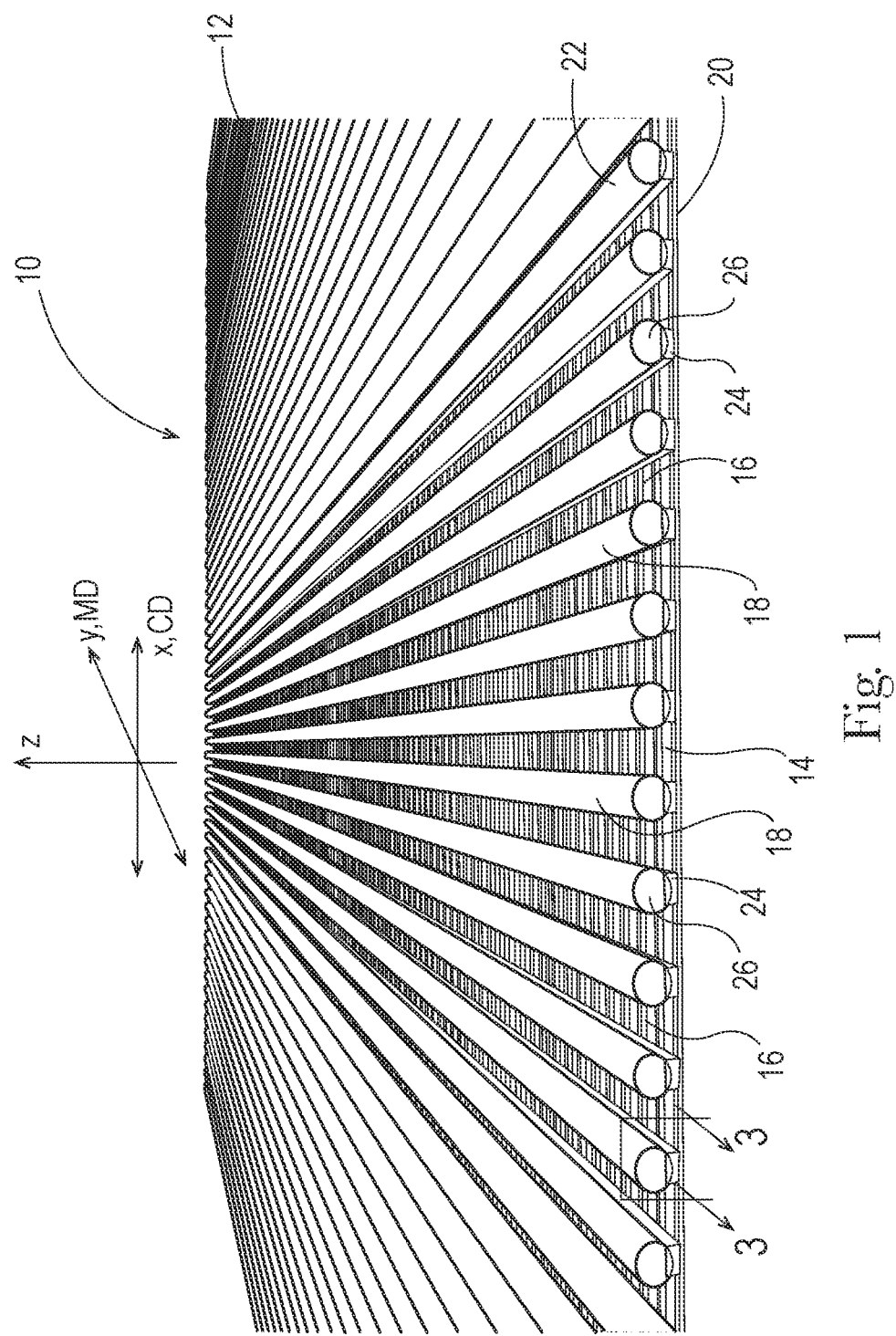
FIG. 1 is a computer generated image showing a perspective view of the structure of an embodiment of a unitary deflection member of the present invention.
Figure 2:
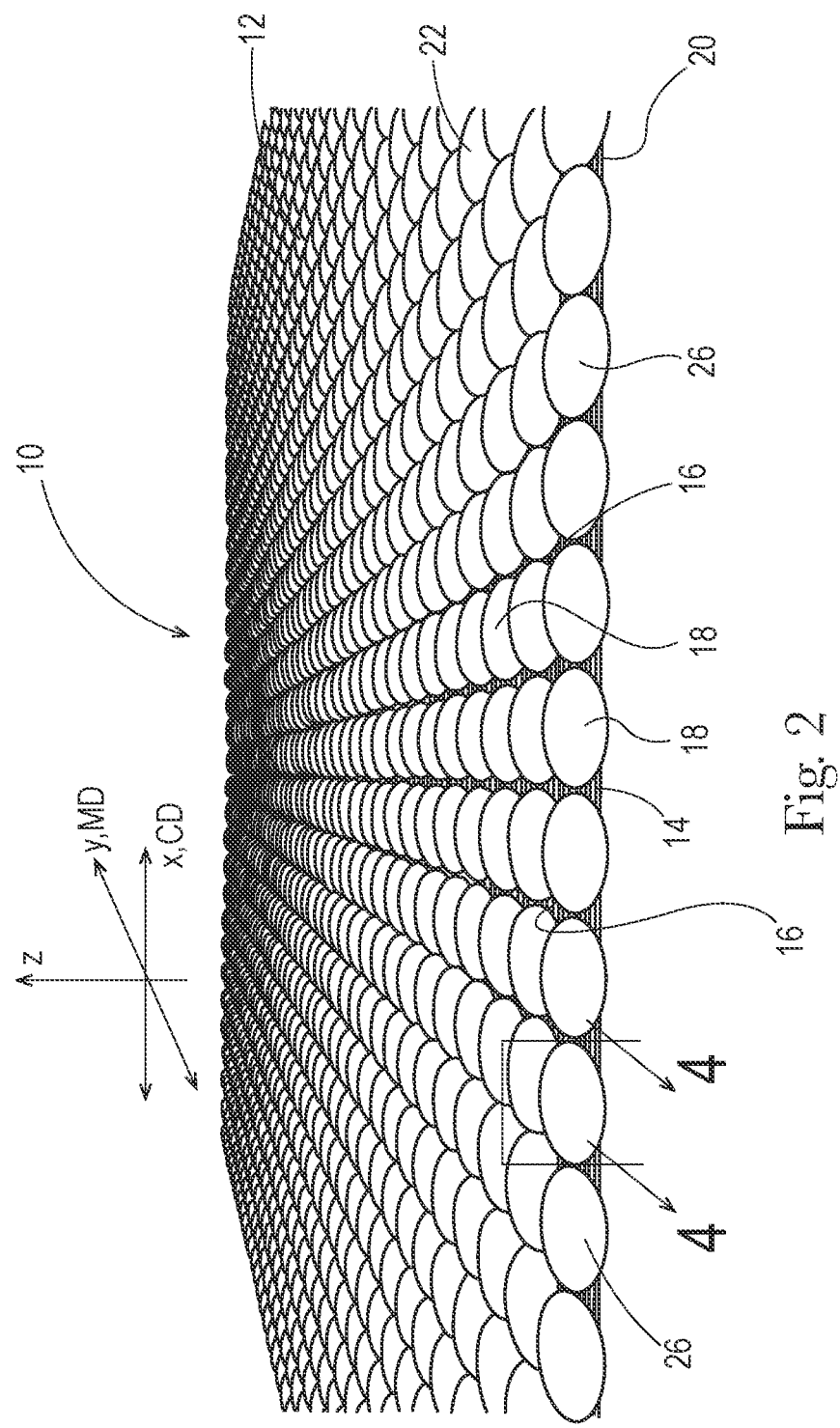
FIG. 2 is a computer generated image showing a perspective view of the structure of an embodiment of a unitary deflection member of the present invention.
Figure 3:
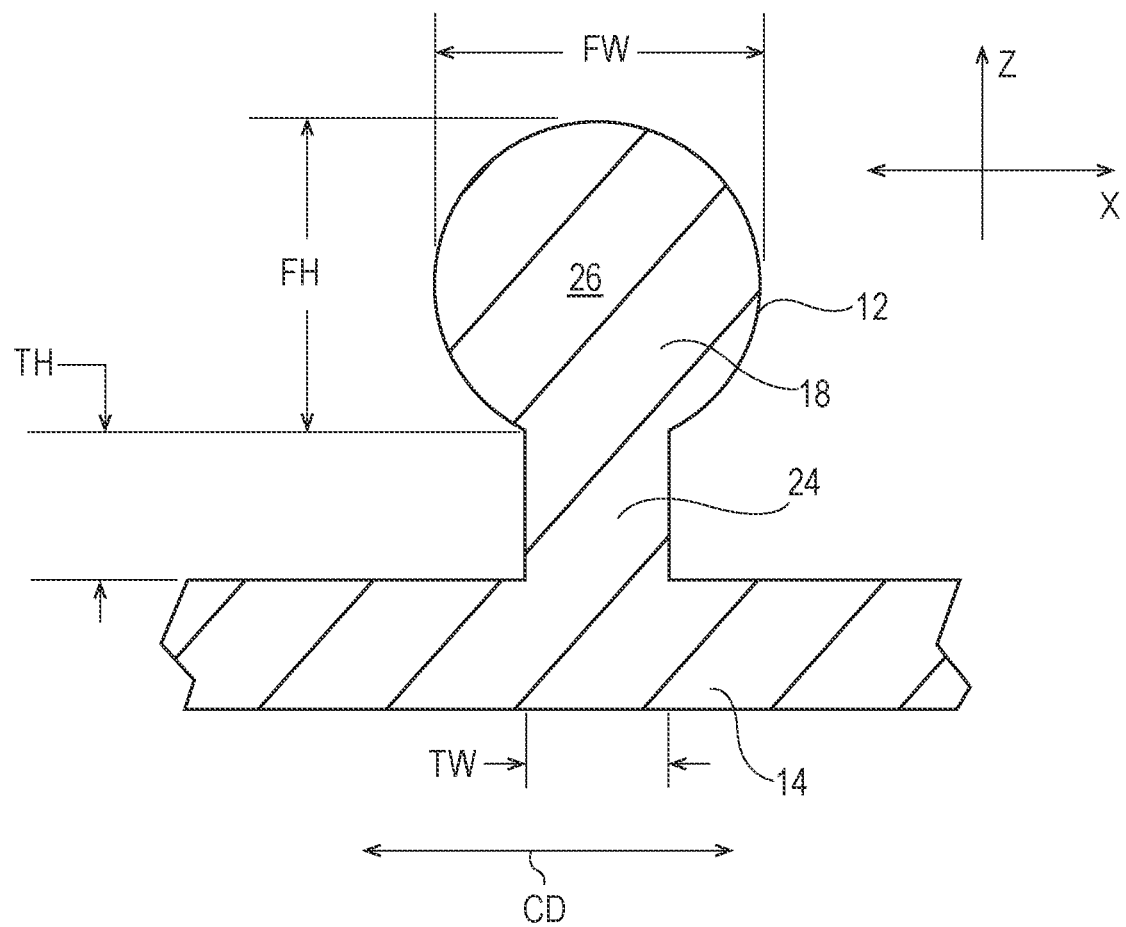
FIG. 3 is a cross-sectional view of the unitary deflection member shown in FIG. 1, taken along lines 3-3 of FIG. 1.
Figure 4:
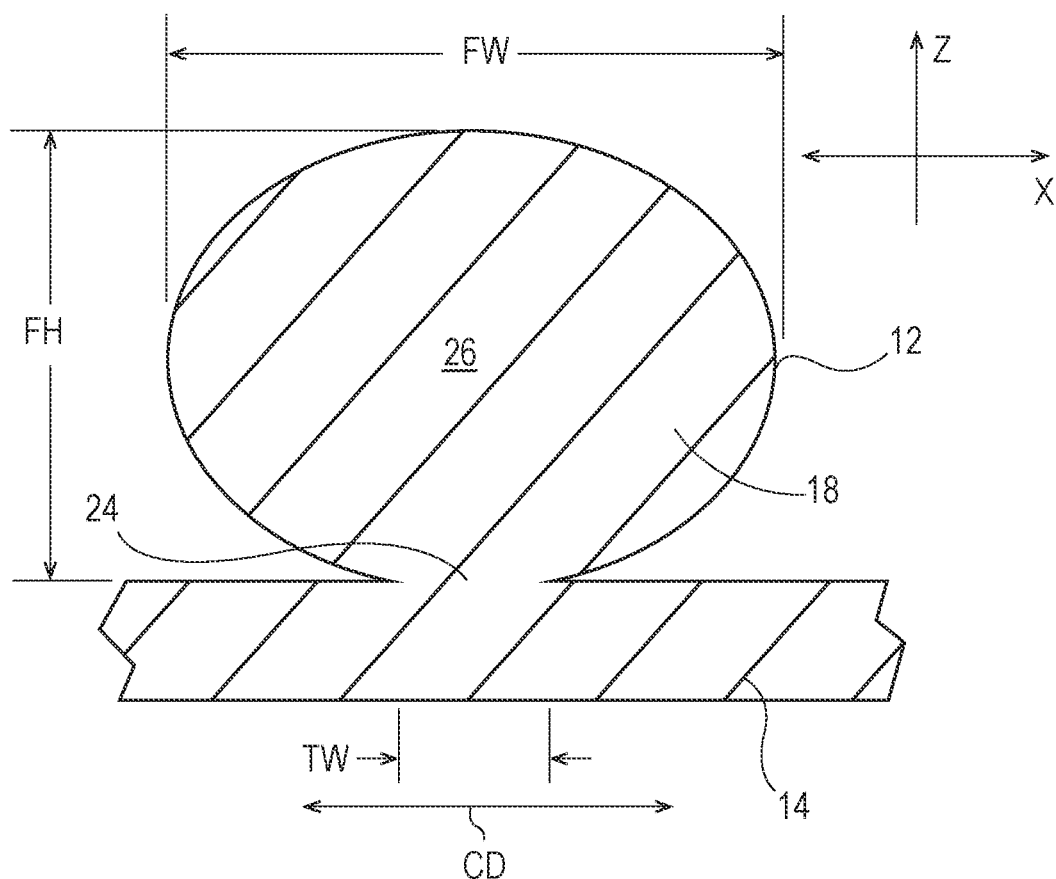
FIG. 4 is a cross-sectional view of the unitary deflection member shown in FIG. 2, taken along lines 4-4 of FIG. 2.
Figure 5:
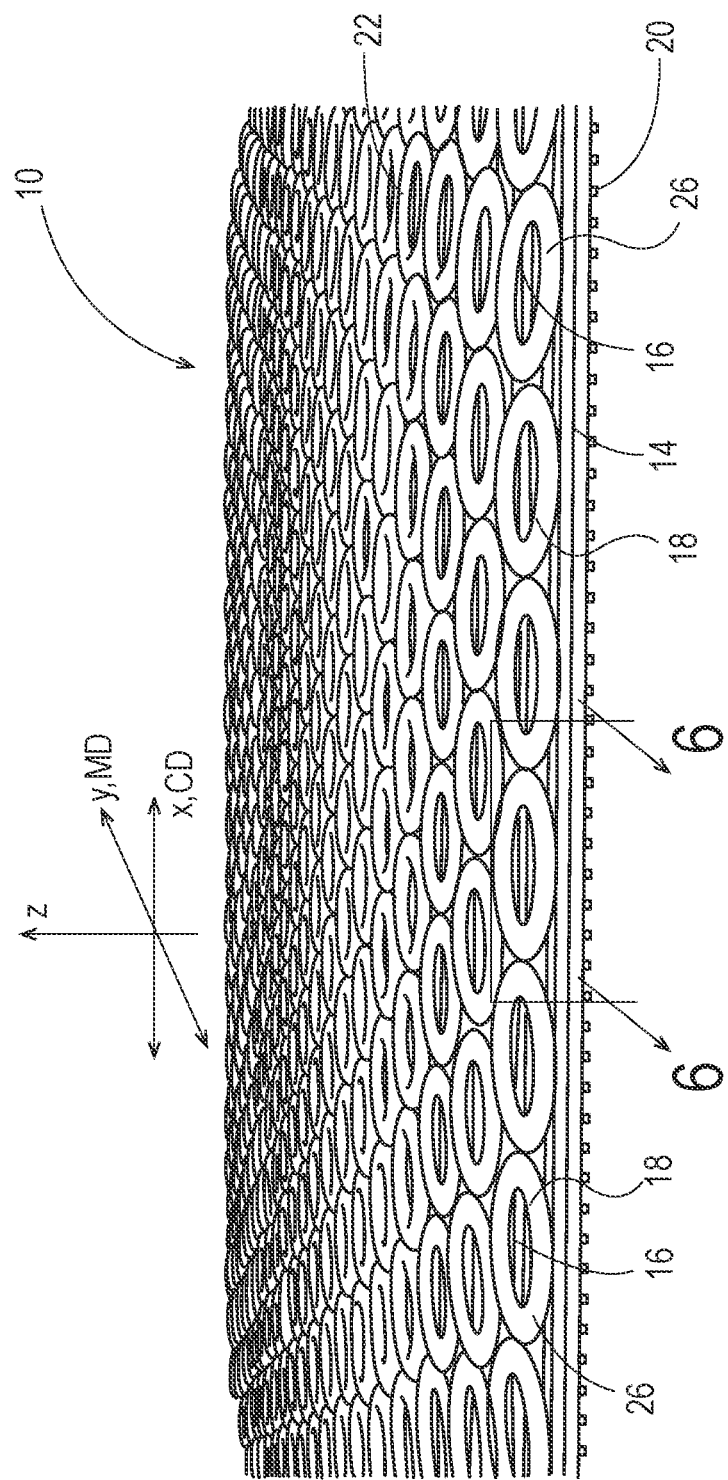
FIG. 5 is a computer generated image showing a perspective view of the structure of an embodiment of a unitary deflection member of the present invention.

As shown in FIGS. 1-6, a unitary deflection member 10 of the present invention can comprise two identifiable portions: a patterned framework 12 and a reinforcing member 14. The unitary deflection members shown in FIGS. 1, 3 and 5 are digitally produced images of non-limiting embodiments of unitary deflection members. The digital images are utilized in the method of making a unitary deflection member 10, as described in more detail below. Because of the precision associated with additive manufacturing technology, the unitary deflection member 10 has a substantially identical structure as that depicted in the digital images, thus the digital images will be used to describe the various features of the unitary defection member 10.

The reinforcing member is foraminous, having an open area sufficient to allow water to pass through during drying processes, but nevertheless preventing fibers to be drawn through in dewatering processes, including pressing and vacuum processes. As fibers are molded into the deflection member during production of fibrous substrates, the reinforcing member serves as a "backstop" to prevent, or minimize fiber loss through the unitary deflection member.

The patterned framework 12 has one or more deflection conduits 16, which are the voids between protuberances 18, which are Z-directional unitary structures primarily used to form corresponding fibrous structures made on the deflection member 10. The reinforcing member 14 provides for fluid permeable structural stability of the deflection member 10. The unitary deflection member 10 may be made from a variety of materials or combination of materials, limited only by the additive manufacturing technology used to form it and the desired structural properties such as strength and flexibility. In an embodiment the unitary deflection member 10 can be made from metal, metal-impregnated resin, plastic, or any combination thereof. In an embodiment, the unitary deflection member is sufficiently strong and/or flexible to be utilized as a papermaking belt, or a portion thereon, in a batch process or in commercial papermaking equipment.

The unitary deflection member 10 has a backside 20 and a web side 22. In a fibrous web making process, the web side is the side of the deflection member on which fibers, such as papermaking fibers, are deposited. As defined herein, the backside 20 of the deflection member 10, forms an X-Y plane, where X and Y can correspond generally to the CD and MD, respectively, when in the context of using the deflection member 10 to make paper in a commercial papermaking process. One skilled in the art will appreciate that the symbols "X," "Y," and "Z" designate a system of Cartesian coordinates, wherein mutually perpendicular "X" and "Y" define a reference plane formed by the backside 20 of the unitary deflection member 10 when disposed on a flat surface, and "Z" defines a direction orthogonal to the X-Y plane. The person skilled in the art will appreciate that the use of the term "plane" does not require absolute flatness or smoothness of any portion or feature described as planar. In fact, the backside 20 of the deflection member 10 can have texture, including so-called "backside texture" which is helpful when the deflection member is used as a papermaking belt on vacuum rolls in a papermaking process as described in Trokhan or Cabell et al.

As used herein, the term "Z-direction" designates any direction perpendicular to the X-Y plane. Analogously, the term "Z-dimension" means a dimension, distance, or parameter measured parallel to the Z-direction and can be used to refer to dimensions such as the height of protuberances or the thickness, or caliper, of the unitary deflection member. It should be carefully noted, however, that an element that "extends" in the Z-direction does not need itself to be oriented strictly parallel to the Z-direction; the term "extends in the Z-direction" in this context merely indicates that the element extends in a direction which is not parallel to the X-Y plane. Analogously, an element that "extends in a direction parallel to the X-Y plane" does not need, as a whole, to be parallel to the X-Y plane; such an element can be oriented in the direction that is not parallel to the Z-direction.

Figure 15:
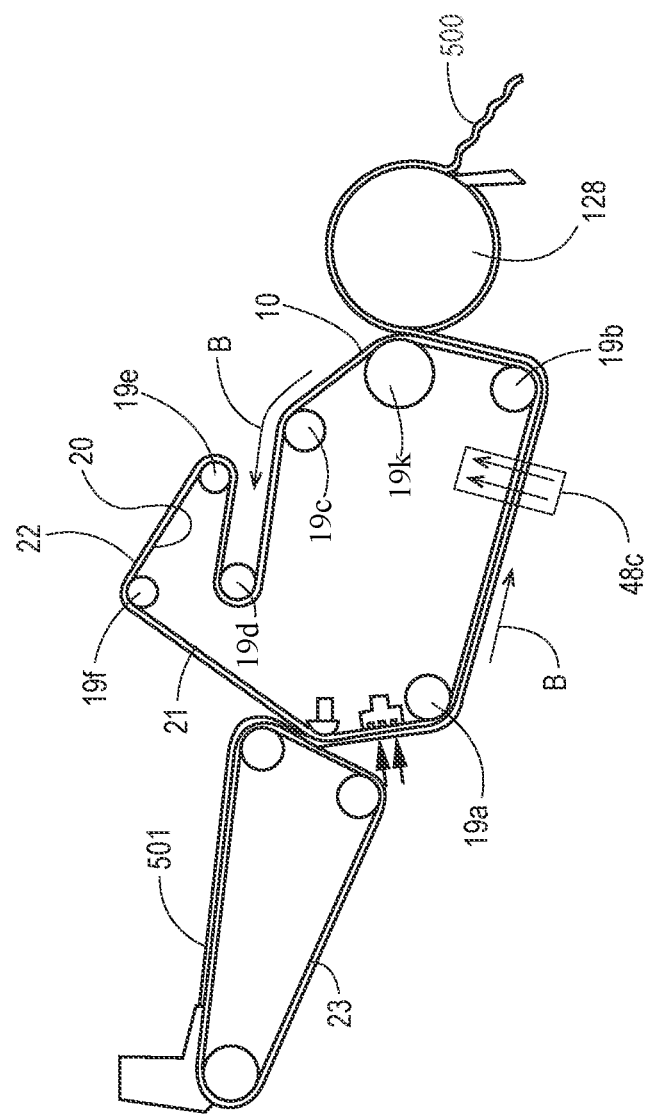
FIG. 15 is a schematic side-elevational view of the process of making a fibrous structure according to one embodiment of the present invention.

One skilled in the art will also appreciate that the unitary deflection member 10 as a whole, does not need to (and indeed cannot in some embodiments) have a planar configuration throughout its length, especially if sized for use in a commercial process for making a fibrous structure 500 of the present invention, and in the form of an flexible member or belt that travels through the equipment in a machine direction (MD) indicated by a directional arrow "B" (FIG. 15). The concept of the unitary deflection member 10 being disposed on a flat surface and having the macroscopical "X-Y" plane is conventionally used herein for the purpose of describing relative geometry of several elements of the unitary deflection member 10 which can be generally flexible. A person skilled in the art will appreciate that when the unitary deflection member 10 curves or otherwise deplanes, the X-Y plane follows the configuration of the unitary deflection member 10.

As used herein, the terms containing "macroscopical" or "macroscopically" refer to an overall geometry of a structure under consideration when it is placed in a two-dimensional configuration. In contrast, "microscopical" or "microscopically" refer to relatively small details of the structure under consideration, without regard to its overall geometry. For example, in the context of the unitary deflection member 10, the term "macroscopically planar" means that the unitary deflection member 10, when it is placed in a two-dimensional configuration, has—as a whole—only minor deviations from absolute planarity, and the deviations do not adversely affect the unitary deflection member's performance. At the same time, the patterned framework 12 of the unitary deflection member 10 can have a microscopical three-dimensional pattern of deflection conduits and suspended portions, as will be described below.

Figure 6:
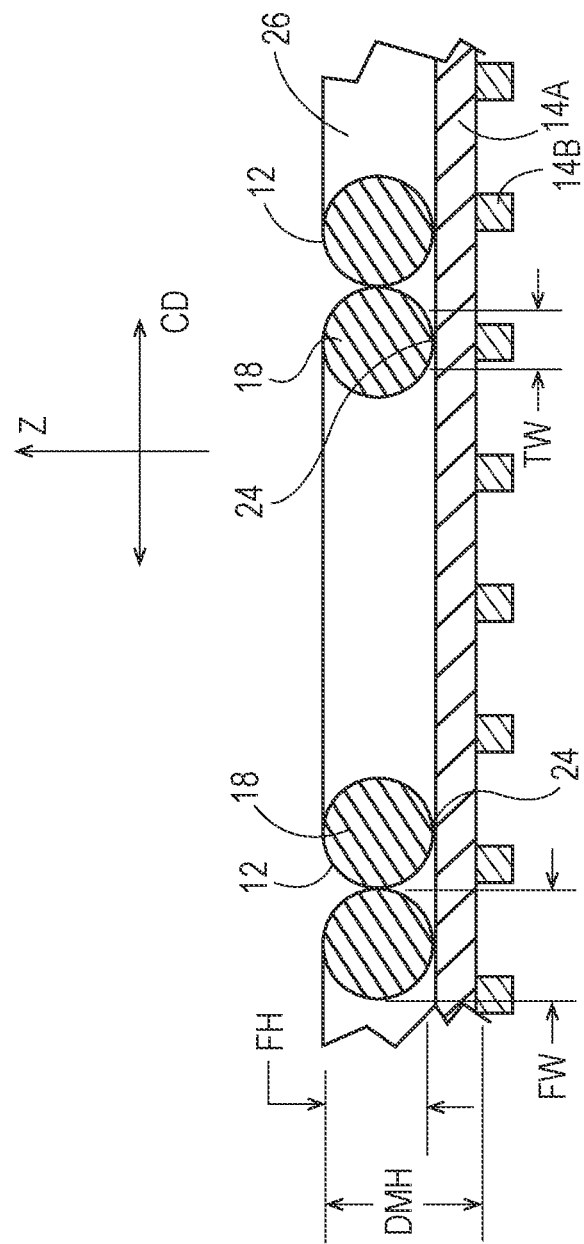
FIG. 6 is a cross-sectional view of the unitary deflection member shown in FIG. 2, taken along lines 6-6 of FIG. 5.

As shown in FIGS. 1, 3 and 5, and in more detail in the cross-sectional views of FIGS. 2, 4 and 6, the patterned framework 12 comprises a plurality of protuberances 18. Each protuberance 18 extends in the Z-direction on the web-side 22 of the deflection member. Each of the plurality of protuberances 18 can be unitary with the reinforcing member 14 and extends therefrom in the Z-direction at a transition portion 24. The transition portion 24 is the region at which the unitary structure deviates in the Z-direction from the reinforcing member 14 and transitions the protuberance from a proximal end at the reinforcing member 14 through a transition region height TH in the Z-direction to a distal end with the protuberance forming portion 26. The key distinction for a unitary deflection member as described is that at the transition regions 32 between the reinforcing member 14 and the transition portion 24, and between the transition portion 24 and the protuberance 18, there is no joining of discrete parts, e.g., curable resin on a woven filament backing. The reinforcing member, transition portions and the protuberances can be of one material, with an uninterrupted material transition between any two parts. Portions of the reinforcing member, transitions portions and the protuberances can differ in material content, but in the unitary deflection members described herein the material transition is due to different materials used in an additive manufacturing process, and not to discrete materials adhered, cured, or otherwise joined.

The transition portion 24 can be substantially a plane, with little to no Z-dimension height TH, as can be understood from the unitary structure shown in cross section in FIGS. 4 and 6, which is a cross-sectional view of the structure shown in FIGS. 2 and 5, respectively. Likewise, the transition portion 24 can have a Z-dimension height TH of from about 0.1 mm to about 5 mm, essentially permitting the forming portion 26 of the protuberance 18 to "stand off" from the reinforcing member, as can be understood from the unitary structure shown in cross section in FIG. 3, which is a cross sectional view of the structure shown in FIG. 1.

The transition portion 24 can have a transition portion width TW, which is the smallest dimension of the cross-section of the transition portion parallel to the X-Y plane. Thus, if the transition portion 24 is substantially cylindrical, the TW can be the diameter of the circular cross-section. If the transition portion 24 is substantially elongated or linear in the MD, as shown in FIG. 1, the TW is the width of the transition portion 24 in the CD, as shown in FIG. 3. If the protuberance 18 is "donut" shaped with a transition height TH of essentially zero, as shown in FIG. 6, the TW can be the smallest dimension across the donut shape parallel to the X-Y along the circumference of the donut shape at the transition region. The skilled person will recognize from the disclosure herein that the possible shapes for transition portions and forming portions is practically unlimited, but in any shape, the dimensions of the transition regions and forming portions can be discerned according to the principles disclosed herein.

The forming portions 26 can extend in at least one direction outwardly from a distal end of the transition portion 24 parallel to the X-Y such that the forming portions 26 have at least one dimension FW measured parallel to the X-Y plane that is greater than the transition portion width TW. The space between the plurality of protuberances 18 forms deflection conduits 16 that extend in the Z-direction from the web side 22 toward the backside 20 of the deflection member 10 and provide spaces into which a plurality of fibers can be deflected during a papermaking process, to form so-called fibrous "pillows" 510 adjacent to, and possibly surrounded by, so-called "knuckles" 520 of the fibrous structure 500 (as depicted more fully in FIGS. 13 and 14). In a fluid-permeable unitary deflection member 10, the deflection conduits extend from the web side 22 to the backside 20 through the entire thickness of the patterned framework 12.

In general, the deflection conduits 16 can be semi-continuous (as shown in FIG. 1), continuous (as shown in FIG. 2), or discontinuous, i.e., discrete (as shown in FIG. 5). Correspondingly, the protuberances 18 can be semi-continuous (as shown in FIG. 1), continuous (as shown in FIG. 5), or discontinuous, i.e., discrete (as shown in FIG. 3). As can be understood from the description of the patterned framework of the deflection member 10, fibrous structures made on the deflection member can have semi-continuous knuckles and pillows (if made on a deflection member having the structure of FIG. 1), or continuous, pillows and discontinuous i.e., discrete, knuckles (if made on a deflection member having the structure of FIG. 2), or discontinuous, i.e., discrete, pillows and continuous knuckles (if made on a deflection member having the structure of FIG. 5).

The term "continuous" refers to a portion of the patterned framework 12, which has "continuity" in all directions parallel to the X-Y plane, and in which one can connect any two points on or within that portion by an uninterrupted line running entirely on or within that portion throughout the line's length.

The term "semi-continuous framework" refers to a layer of the patterned framework 12, which has "continuity" in all but at least one, directions parallel to the X-Y plane, and in which layer one cannot connect any two points on or within that layer by an uninterrupted line running entirely on or within that layer throughout the line's length.

The term "discrete" with respect to deflection conduits or protuberances on the patterned framework 12 refer to portions that are stand-alone and discontinuous in all directions parallel to the X-Y plane. A patterned framework 12 comprising plurality of discrete protuberances is shown in FIG. 2. In a patterned framework 12 of discrete protrusions 18, the deflection conduit is continuous.

To summarize the various types of deflection members described in FIGS. 1-6, the patterned framework of a deflection member as shown in FIG. 1 is an example of a deflection member having a semi-continuous framework of protuberances and deflection conduits. The patterned framework of a deflection member as shown in FIG. 2 is an example of a deflection member having a continuous deflection conduit and discrete protuberances. The patterned framework of a deflection member as shown in FIG. 5 is an example of a deflection member having discrete deflection conduits and continuous protuberances.

There are virtually an infinite number of shapes, sizes, spacing and orientations that may be chosen for transition portions 24 and forming portions 26, and correspondingly, the resulting protuberances 18 and deflection conduits 16. The actual shapes, sizes, orientations, and spacing can be specified and manufactured by additive manufacturing processes based on a desired design of the end product, such as a fibrous structure having a regular pattern of substantially identical "bulbous" pillows, as discussed in more detail below. The improvement of the present invention is that the shapes, sizes, spacing, and orientations of the protuberances 18, including protuberances having transition portions 24 and forming portions 26 is not limited by the constraints imposed on deflection members previously produced via UV-curing a resin through a patterned mask. That is, the size and shape of reinforcing members 14, protuberances 18, and, if present, the transition portions 24 and forming portions 26 are not limited to the shapes that can be produced by essentially "line of sight" light transmission curing from above, i.e., light directed toward the deflection member from the web side 22. For example, such line of sight light transmission curing of a curable resin prohibits effective curing of the forming portion 26 having a greater X-Y dimension than the transition portion 24.

In contrast to the "suspended portions" taught in U.S. Pat. No. 6,660,129, which extend from the plurality of protuberances in at least one direction, the forming portions 26 of the present invention can be uniform and repeated in size and shape across two or more, or all of, the plurality of protuberances. That is, rather than be randomly distributed in a pattern that cannot be predetermined because of the constraints of mask design and placement, the protuberances 18 of the present invention can be made uniformly the same throughout the deflection member. In an embodiment, at least two protuberances 18 on the unitary deflection member 10 can be substantially identical in size and shape. By "substantially identical" is meant that the design intent is to have two or more protuberances be identical in size and shape, but due to manufacturing limitations or irregularities there may be some slight differences. Two protuberances that are the same shape and within 5% of each other in total cross-sectional (as depicted in FIGS. 3 and 4) are considered to be the substantially identical. In an embodiment, at least two protuberances 18 on the unitary deflection member 10 are of similar size and shape. By "similar" is meant that the design intent is that the two or more protuberances have the same shape or size, but some variations may be present throughout the patterned framework. Two protuberances that are essentially the same shape and within 15% of each other in total cross-sectional area (as depicted in FIGS. 3 and 4) are considered to be similar in size and shape.

As shown in FIG. 1, the unitary deflection member 10 can be described as comprising two identifiable portions: a patterned framework 12 and a reinforcing member 14. The reinforcing member can be fluid pervious, and can be generally described as a reticulating pattern or grid of material. The reinforcing member 14 can structurally mimic a weave pattern of, and generally corresponds functionally to, the woven filament reinforcing members utilized in the process of Trokhan or Cabell et al., discussed above. The reinforcing member 14 can be multilayer, that is, in addition to a CD element, as shown in FIG. 6 as element 14A, the reinforcing member can have MD oriented elements, such as shown in FIG. 6 as element 14B, at a different Z-direction elevation relative to the CD element. Of course, any multi-level, multilayer structure for the reinforcing member can be utilized, with elements oriented in any direction, as long as it is sufficiently strong, flexible, and fluid pervious to be used in a batch or commercial papermaking process. A fluid permeable reinforcing member can have a defined percent open area which can be from about 1% to about 99%, or from about 10% to about 80%, or from about 20% to about 60%, or from about 1% to about 50%, or from about 1% to about 30%, or from about 1% to about 20%. In the present invention the reinforcing member 14 can be designed and built in virtually infinite sizes and shapes, which gives greater design freedom with respect to size, shape, and percent open area, as compared to prior woven filament reinforcing members.

The patterned framework 12 of protuberances 18 defines the deflection conduits 16 used to form a corresponding fibrous structure made on the deflection member 10. The patterned framework 12 can comprise at least two protuberances 18, each being similar, or substantially identical, in size and shape. The protuberances 18 have transition portions 24 and forming portions 26. In an embodiment the patterned framework 12 comprises a plurality of protuberances 18, all of which are similar, or substantially identical, in size and shape. In an embodiment the patterned framework 12 comprises a plurality of spaced apart protuberances 18, all of which comprise substantially identically shaped and sized transition portions 24 and forming portions 26, and the protuberances 18 can be disposed in a regular, spaced apart configuration of parallel, linear segments the X-Y plane in either the MD (as shown in FIG. 1), or CD, or diagonally at some angle to the MD and CD, and the protuberances correspondingly define substantially identically shaped and sized deflection conduits 16 between each of adjacent protuberances 18. In common, non-limiting language, the protuberances 18 can be described as lines or ridges of protuberances, the lines being straight or curvilinear, but remaining substantially parallel, and wherein the forming portion width FW is greater than the transition portion width TW to exhibit a "bulbous" impression in cross-section. Thus, in cross-section, the lines of protuberances can be, for example, key-hole-shaped (FIG. 1), mushroom-shaped, circular, oval, inverted triangular, T-shaped, inverted L-shaped, egg- or pebble-shaped, or combinations of these shapes in which the forming portion width PW is greater than the transition portion width TW in each discrete protuberance.

Additionally, as shown in FIG. 2, the unitary deflection member 10 can be described as comprising two identifiable portions: a patterned framework 12 and a reinforcing member 14. The reinforcing member can be fluid pervious. The patterned framework 12 defines the deflection conduits 16 used to form a corresponding structure in paper made on the deflection member 10, and the reinforcing member 14 provides for structural stability. The patterned framework 12 comprises at least two protuberances 18, each being similar, or substantially identical, in size and shape. In an embodiment the patterned framework 12 comprises a plurality of discrete protuberances 18, all of which comprise substantially identically shaped and sized transition portions 24 and forming portions 26. In an embodiment the patterned framework 12 comprises a plurality of protuberances 18, all of which comprise substantially identically shaped and sized transition portions 24 and forming portions 26, and the protuberances 18 are disposed in a regular, spaced apart configuration of discrete units in the X-Y plane, distributed in both the MD and CD in a regular, spaced pattern. The protuberances can correspondingly define a continuous deflection conduit 16 defined by the void portion between the protuberances 18. In common, non-limiting language, the protuberances 18 can be described as discrete, spaced apart protuberances, each protuberance having a shape that can be egg- or pebble-shaped (FIG. 2), or donut-shaped (as in FIG. 5), mushroom-shaped, or any other shape or combination of shapes in which the forming portion width PW is greater than the transition portion width TW in each discrete protuberance.

Further, as shown in FIG. 5 the unitary deflection member 10 can be described as comprising two identifiable portions:

a patterned framework 12 and a reinforcing member 14. The reinforcing member can be fluid pervious. As shown in FIG. 6, which is a cross-sectional view of the deflection conduit 10 of FIG. 5, the reinforcing member 14 can CD-oriented strands 14A and MD-oriented strands 14B in a two-layer stacked configuration. But the strands of the reinforcing member can be a simple grid, or it can mimic a woven pattern, or it can be any other pattern that renders it fluid permeable while maintaining structural stability. The patterned framework 12 defines the deflection conduits 16 used to form a corresponding structure in paper made on the deflection member 10, and the reinforcing member 14 provides for structural stability. The patterned framework 12 of FIG. 5 shows a continuous protuberance 18. That is, while maintaining an appearance of discrete donut-shaped protuberances, the protuberance 18 of FIG. 5 is actually continuous, i.e., all the Z-direction elements are joined in a "continuous knuckle" version of a deflection member, and the continuous knuckle defines discrete deflection conduits 16 which result in discrete pillows in a fibrous structure made thereon.

The invention has heretofore been described as a deflection conduit with protuberances having the forming portion width FW greater than the transition portion width TW to exhibit a "bulbous" impression in cross-section, but the deflection member need not have this feature. That is, the invention can be a unitary deflection member having a backside defining an X-Y plane, and a plurality of protuberances, wherein each protuberance has a three-dimensional shape such that any cross-sectional area of the protuberance parallel to the X-Y plane has an equal or greater area than any cross-sectional area of the protuberance being a greater distance from the X-Y plane in the Z-direction.

Thus, as shown in FIGS. 7-10 show non-limiting example of cross-sectional shapes of protuberances that do not exhibit a bulbous impression, or otherwise have a forming portion width FW greater than a transition portion width TW. The images of FIGS. 7-10 show in cross-section representative protrusion shapes in elevation, analogous to the cross-sectional shapes shown in FIGS. 3, 4, and 6. The example shapes shown in FIGS. 7-10 are intended to be representative of a virtually unlimited number of shapes and sizes, with the commonality being that the deflection member is unitary. In an embodiment, the unitary reinforcing member and the protuberances are manufactured in a process of additive manufacturing to be a unitary structure, and are not manufactured by joining together separate components into a deflection member.

Figure 7:
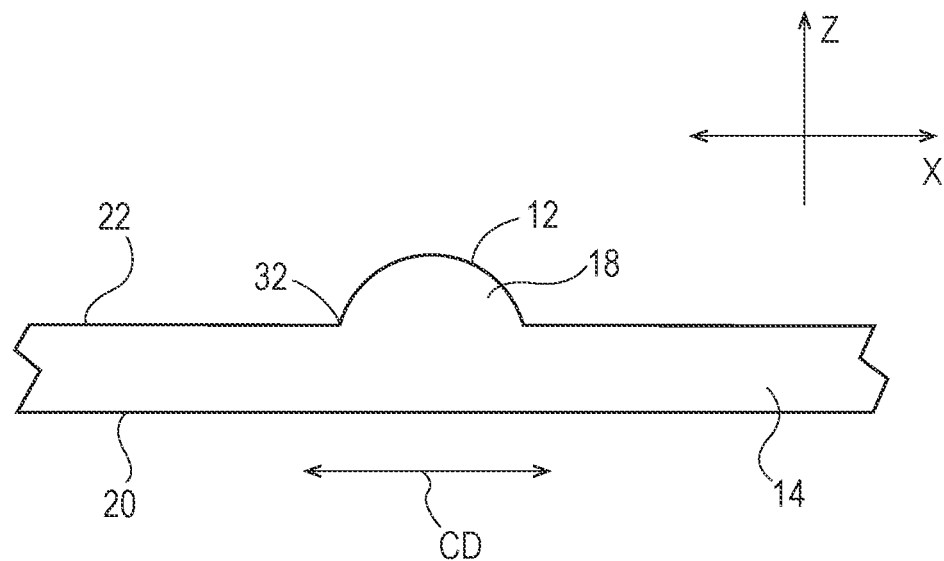
FIG. 7 is a schematic representation of a cross-sectional view of a portion of a unitary deflection member.

As shown in FIG. 7, which shows one representative protuberance 18, the protuberance 18 can have a generally smooth, rounded shape. The reinforcing member 14 can be, or have the appearance of, a grid, a weave, or other open, foraminous structure on which the protuberances are positioned in a pattern. It should be appreciated that the reinforcing member 14 can be multilayer as described above with respect to FIG. 6. It should also be appreciated that the cross-section shown in FIG. 7 shows a single protuberance, but there can be a plurality of closely spaced protuberances having the cross-section shown. Also, the cross-section can be of a protuberance that has the shape of a portion of a sphere, such as a hemisphere, or it can be of a protuberance having an elongated, linear nature, in a semi-continuous pattern similar to that of the protuberances shown in FIG. 1

Figure 8:
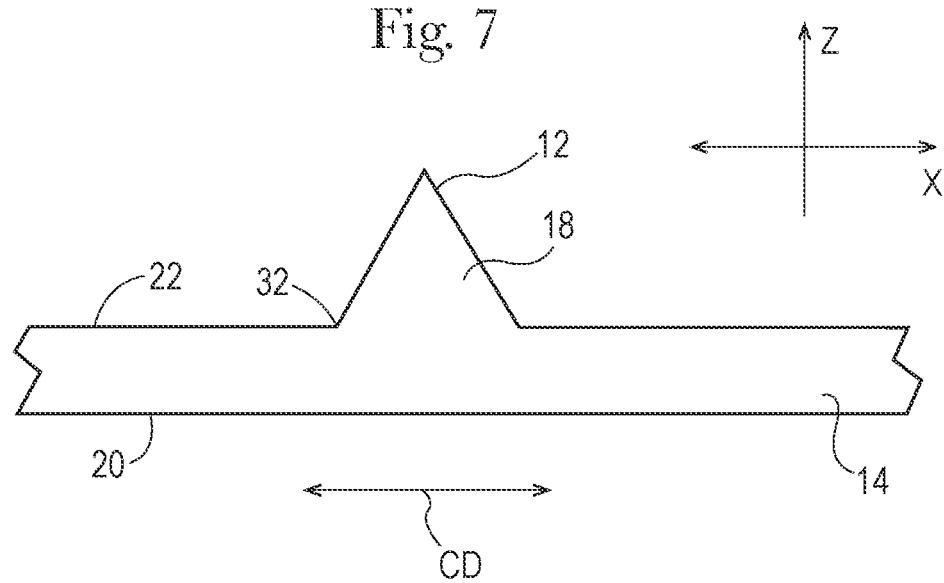
FIG. 8 is a schematic representation of a cross-sectional view of a portion of a unitary deflection member.

As shown in FIG. 8, the protuberance 18 can have a generally pointed, ridged, or pyramidal shape. The reinforcing member 14 can be a grid, a weave, or other open, foraminous structure on which the protuberances are positioned in a pattern. It should be appreciated that the reinforcing member 14 can be multilayer as described above with respect to FIG. 6. It should also be appreciated that the cross-section shown in FIG. 8 shows a single protuberance 18, but there can be a plurality of closely spaced protuberances having the cross-section shown. Also, the cross-section can be of a protuberance that has the shape of a linear ridged element in a semi-continuous pattern similar to that shown in FIG. 1, or it can be a protuberance having a pyramidal shape, such as a three- or four-sided pyramid. Further, the cross-section can be of a protuberance that has the shape of a cone.

Figure 9:
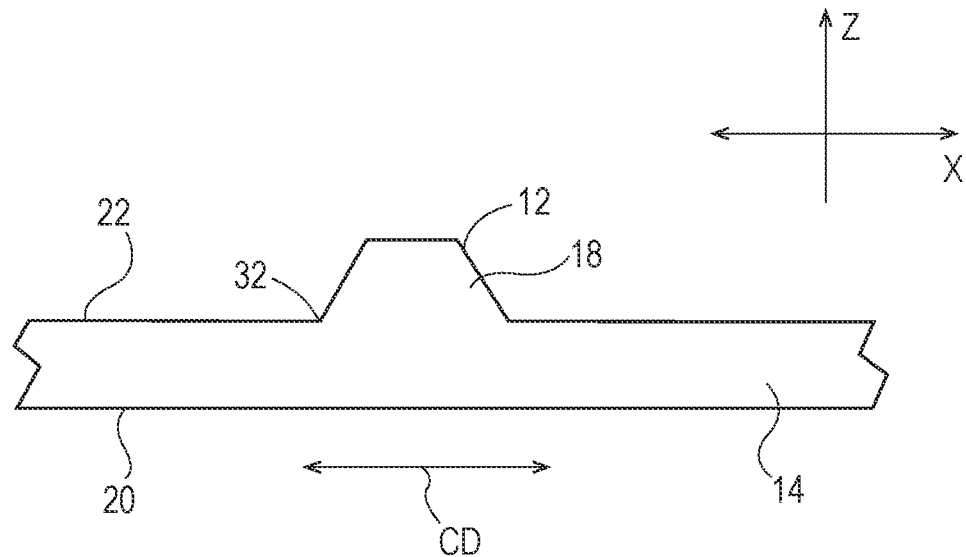
FIG. 9 is a schematic representation of a cross-sectional view of a portion of a unitary deflection member.

As shown in FIG. 9, the protuberance 18 can have a generally flattened, flattened ridged, or truncated pyramidal shape. The reinforcing member 14 can be a grid, a weave, or other open, foraminous structure on which the protuberances are positioned in a pattern. It should be appreciated that the reinforcing member 14 can be multilayer as described above with respect to FIG. 6. It should also be appreciated that the cross-section shown in FIG. 9 shows a single protuberance 18, but there can be a plurality of closely spaced protuberances having the cross-section shown. Also, the cross-section can be of a protuberance that has the shape of a linear flat-topped ridged element in a semi-continuous pattern similar to that shown in FIG. 1, or it can be a protuberance having a truncated pyramidal shape, such as a flat-topped three- or four-sided pyramid. Further, the cross-section can be of a protuberance that has the shape of a truncated cone.

Figure 10:
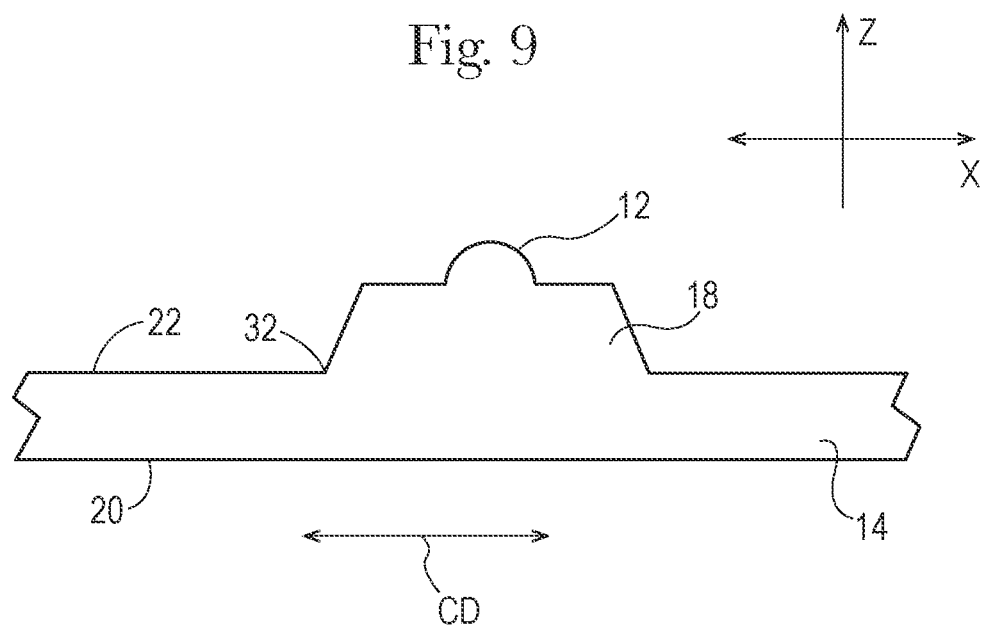
FIG. 10 is a schematic representation of a cross-sectional view of a portion of a unitary deflection member.

As shown in FIG. 10, the protuberance 18 can have a stepped, multilevel shape. Two levels are shown, one generally flat and the other generally curved in a representative shape. The reinforcing member 14 can be a grid, a weave, or other open, foraminous structure on which the protuberances are positioned in a pattern. It should be appreciated that the reinforcing member 14 can be multilayer as described above with respect to FIG. 6. It should also be appreciated that the cross-section shown in FIG. 10 shows a single protuberance 18, but there can be a plurality of closely spaced protuberances having the cross-section shown. Also, the cross-section can be of a protuberance that has the shape of a linear stepped, multilevel shape ridged element in a semi-continuous pattern similar to that shown in FIG. 1, or it can be a protuberance having a series of two or more generally concentric multilevel shapes, such a concentric circular shapes.

Again, the shapes illustrated in FIGS. 7-10 are representative and non-limiting. In general, the invention is a unitary deflection member, the deflection member having a portion identified as a reinforcing member and at least one protuberance extending from the reinforcing member. The deflection member of the type shown in FIGS. 7-10 can exhibit a transition region 32 where the deflection member transitions from the reinforcing member to the protuberance. The key distinction for a unitary deflection member is that at the transition region there is no joining of separate parts, e.g., curable resin on a woven filament backing. The reinforcing member and the protuberances can be of one material or multiple materials, but with an uninterrupted transition blend between one material and another. Portions of the reinforcing member and the protuberances can differ in material content, but in the unitary deflection member the material transition is due to different materials used in an additive manufacturing process, and not to separate materials or parts adhered, cured, or otherwise joined. The protuberances of the deflection member define deflection conduits into which a fibrous structure can be molded. The foraminous nature of the reinforcing structure permits water removal from an embryonic fibrous web, as described more fully below.

Process for Making Unitary Deflection Member

A unitary deflection member can be made by a 3-D printer as the additive manufacturing making apparatus. Unitary deflection members of the invention were made using a MakerBot Replicator 2, available from MakerBot Industries, Brooklyn, N.Y., USA. Other alternative methods of additive manufacturing include, by way of example, selective laser sintering (SLS), stereolithography (SLA), direct metal laser sintering, or fused deposition modeling (FDM, as marketed by Stratasys Corp., Eden Prairie, Minn.), also known as fused filament fabrication (FFF).

The material used for the unitary deflection member of the invention is poly lactic acid (PLA) provided in a 1.75 mm diameter filament in various colors, for example, TruWhite and TruRed. Other alternative materials can include liquid photopolymer, high melting point filament (50 degrees C. to 120 degrees C. above Yankee temperature), flexible filament (e.g., NinjaFlex PLA, available from Fenner Drives, Inc, Manheim, Pa., USA), clear filament, wood composite filament, metal/composite filament, Nylon powder, metal powder, quick set epoxy. In general, any material suitable for 3-D printing can be used, with material choice being determined by desired properties related to strength and flexibility, which, in turn, can be dictated by operating conditions in a papermaking process, for example. In the present invention, the method for making fibrous substrates can be achieved with relatively stiff deflection members.

A 2-D image of a repeat element of a desired unitary deflection member, created in, for example, AutoCad, DraftSight, or Illustrator, can be exported to a 3-D file such as a drawing file in SolidWorks 3-D CAD or other NX software. The repeat unit has the dimensional parameters for wall angles, protrusion shape, and other features of the deflection member. Optionally, one can create a file directly in the a 3-D modeling program, such as Google SketchUp or other solid modeling programs that can, for example, create standard tessellation language (STL) file. The STL file for a repeat element and repeat element dimensions for the present invention was exported to, and imported by, the MakerWare software utilized by the MakerBot printer. Optionally, Slicr3D software can be utilized for this step.

The next step is to assemble objects for the various features of a deflection member, such as the reinforcing member, transition portions, and protuberances, assign Z-direction dimensions for each. Once all the objects are assembled, they are imported and used to make an x3g print file. An x3g file is a binary file that the MakerWare machine reads which contains all of the instructions for printing. The output x3g file can be saved on an SD card, or, optionally connect via a USB cable directly to the computer. The SD card with the x3g file can be inserted into the slot provided on the MakerBot 3-D printer. In general, any numerical control file, such as G-code files, as is known in the art, can be used to import a print file to the additive manufacturing device.

Prior to printing, the build platform of the MakerBot 3-D printer can be prepared. If the build plate is unheated, it can be prepared by covering it with 3M brand Scotch-Blue Painter's Tape #2090, available from 3M, Minneapolis, Minn., USA. For a heated build plate, the plate is prepared by using Kapton tape, manufactured by DuPont, Wilmington, Del., USA, and water soluble glue stick adhesive, hair spray, with a barrier film. The build platform should be clean and free from oil, dust, lint, or other particles.

The printing nozzle of the MakerBot 3-D printer used to make the invention was heated to 230 degrees C.

The printing process is started to print the deflection member, after which the equipment and deflection member are allowed to cool. Once sufficiently cooled, the deflection member can be removed from the build plate by use of a flat spatula, a putty knife, or any other suitable tool or device. The deflection member can then be utilized to a process for making a fibrous structure, as described below.

Figure 11:
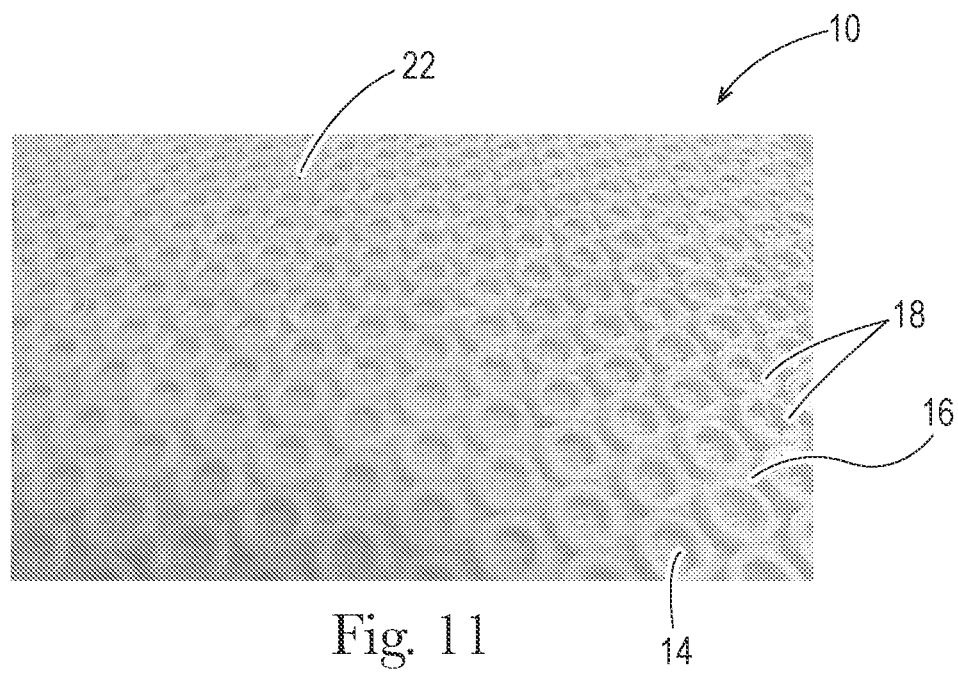
FIG. 11 is a photographic perspective view of a unitary deflection member of the present invention, made according to the present invention.
Figure 12:
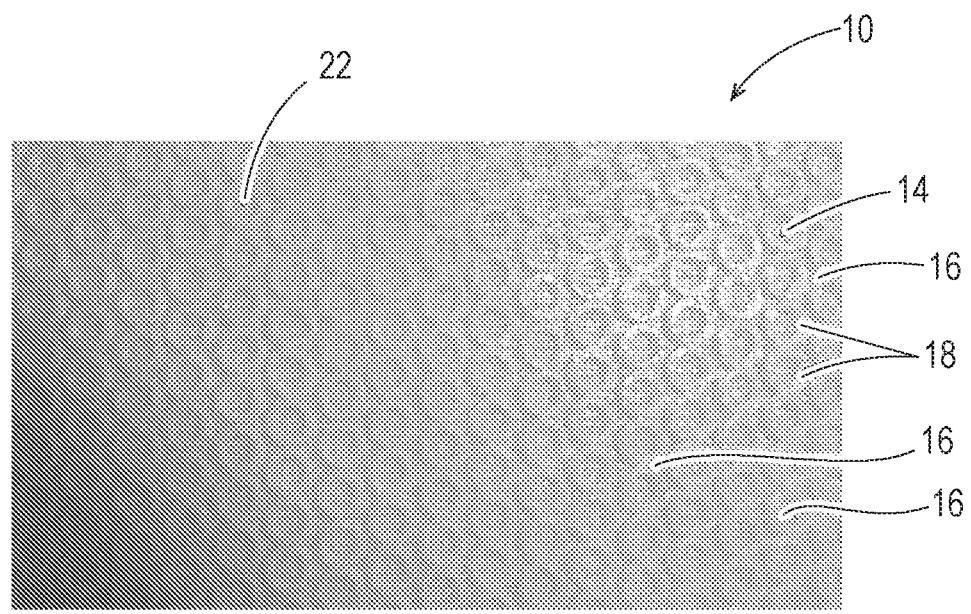
FIG. 12 is a photographic plan view of the unitary deflection member shown in FIG. 11.

FIGS. 11 and 12 show a unitary deflection member made according to the process above. The unitary deflection member has essentially the same shape profile as the digital image of FIG. 5, which image file was utilized in the production of the unitary deflection member. The unitary deflection member shown in FIGS. 11 and 12 was produced using a MakerBot 3-D printer, as described above as a unitary member comprising a pattern of solid torus-shape, or "donut" shapes, the donut shapes defining in their interior thirty-four discrete deflection conduits per square inch.

The unitary deflection member 10 can have a specific resulting open area R. As used herein, the term "specific resulting open area" (R) means a ratio of a cumulative projected open area ($\Sigma R$) of all deflection conduits of a given unit of the unitary deflection member's surface area (A) to that given surface area (A) of this unit, i.e., $R=\Sigma R/A$, wherein the projected open area of each individual conduit is formed by a smallest projected open area of such a conduit as measured in a plane parallel to the X-Y plane. The specific open area can be expressed as a fraction or as a percentage. For example, if a hypothetical layer has two thousand individual deflection conduits dispersed throughout a unit surface area (A) of thirty thousand square millimeters, and each deflection conduit has the projected open area of five square millimeters, the cumulative projected open area ($\Sigma R$) of all two thousand deflection conduits is ten thousand square millimeters, (5 sq. mm×2.000=10,000 sq. mm), and the specific resulting open area of such a hypothetical layer is R=⅓, or 33.33% (ten thousand square millimeters divided by thirty thousand square millimeters).

The cumulative projected open area of each individual conduit is measured based on its smallest projected open area parallel to the X-Y plane, because some deflection conduits may be non-uniform throughout their length, or thickness of the deflection member. For example, some deflection conduits may be tapered as described in commonly assigned U.S. Pat. Nos. 5,900,122 and 5,948,210. In other embodiments, the smallest open area of the individual conduit may be located intermediate the top surface and the bottom surface of the unitary deflection member.

The specific resulting open area of the unitary deflection member can be at least ⅕ (or 20%), more specifically, at least ⅖ (or 40%), and still more specifically, at least ⅗ (or 60%). According to the present invention, the first specific resulting open area R1 may be greater than, substantially equal to, or less than the second resulting open area R2.

Figure 13:
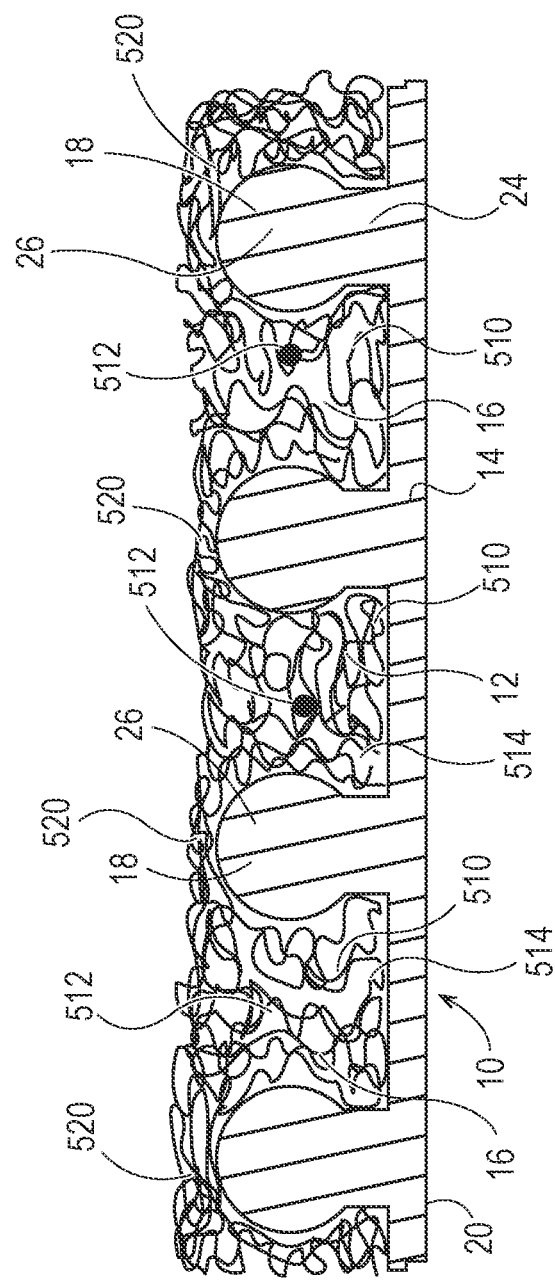
FIG. 13 is a schematic cross-sectional view of a representative deflection conduit having fibers of a fibrous structure deposited thereon.

The deflection member shown in FIGS. 11 and 12 was made in a generally flat configuration built up by additive manufacturing processes from a backside 20 to a web side 22. If made of sufficient dimensions such deflection members can be seamed to form a continuous belt, as is currently done in the field of woven papermaking belts. However, the deflection member of the present invention can also be achieved in a seamless belt configuration, as shown in FIG. 13. That is, the deflection member can be built up in the form of a seamless belt with the backside 20 being the interior surface of the belt, and the web side 22 being the exterior surface of the belt.

The seamless belt deflection member shown in FIG. 13 is depicted generally in the form of a cylinder, but the form need not be cylindrical. As shown, a first perimeter edge 34 of the deflection member 10 forms one end of the cylindrical form, and can be the base in contact with the build plate of the additive manufacturing device, such as the MakerBot 3-D printer used to make the seamless belt deflection member 10 shown in FIG. 13 by methods as described above. Likewise, the additive manufacturing process builds the deflection member upwardly in the direction of the arrow W in FIG. 13, signifying that the ultimate dimension in this direction can be considered the width of the resulting belt so formed. Once formed, the seamless belt deflection member 10 can be mounted on a cylinder (such as a vacuum cylinder) of like dimensions, or supported by rolls in a non-cylindrical configuration and utilized as a deflection member for forming a fibrous structure.

The seamless belt deflection member 10 can have protuberances 18 and deflection conduits 16 as described herein, with it being understood that X, Y, and Z dimensions translate accordingly as shown in FIG. 13. That is, the X and Y coordinates can be considered to be in the plane of a localized section of the seamless belt deflection member 10, and the Z direction can be considered to extend radially outward from backside 20 to web side 22.

Fibrous Structure

One purpose of the deflection member 10 is to provide a forming surface on which to mold fibrous structures, including sanitary tissue products, such as paper towels, toilet tissue, facial tissue, wipes, dry or wet mop covers, and the like. When used in a papermaking process, the deflection member 10 can be utilized in the "wet end" of a papermaking process, as described in more detail below, in which fibers from a fibrous slurry are deposited on the web side 22 of deflection member 10. As discussed below, a portion of the fibers can be deflected into the deflection conduits 16 of the unitary deflection member 10 to cause some of the deflected fibers or portions thereof to be disposed within the void spaces, i.e., the deflection conduits, formed by, i.e., between, the protuberances 18 of the unitary deflection member 10.

Figure 14:
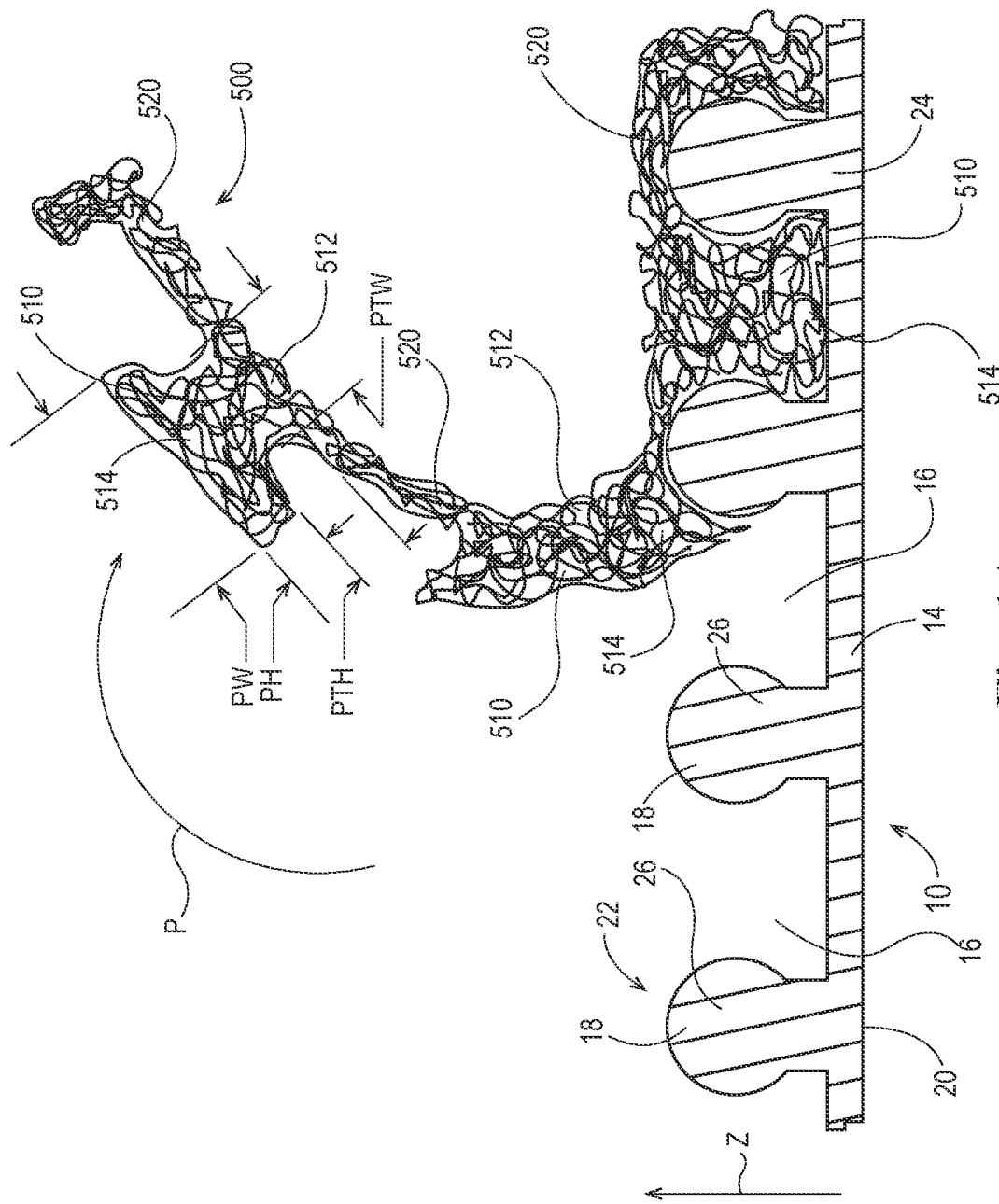
FIG. 14 is a schematic cross-sectional view of a representative deflection conduit having fibers of a fibrous structure being removed therefrom.

Thus, as can be understood from the description above, and FIGS. 14 and 15, the fibrous structure 500 can mold to the general shape of the deflection member 10, including the deflection conduits 16 such that the shape and size of the knuckles and pillow features of the fibrous structure are a close approximation of the size and shape of the protuberances 18 and deflection conduits 16. A cross-section of a representative deflection member 10 is shown in FIGS. 14 and 15. Note that the cross-section shown in FIGS. 13 and 14 can be from a deflection member having semi-continuous protuberances and deflection conduits, such as that shown in FIG. 1, or it can also be from a deflection member having discrete protuberances 18, each of which have a substantially cylindrical transition portion 24 and a substantially spherical forming portion 26, much like a "golf ball on a T" as shown in FIG. 2, or it can also be from a deflection member having a continuous protuberance and discrete deflection conduits. Thus, the cross-section shown is not intended to be limiting but representative to explain the formation of fibrous structures.

As depicted in FIG. 14, fibers can be pressed or otherwise introduced over the protuberances and into the deflection conduits 16 at a constant basis weight to form relatively low density pillows 510 in the finished fibrous structure. Likewise, fibers disposed on the forming portion 26 of protuberances 18 can form generally high density knuckles 520.

Importantly, however, when dried and removed from the deflection conduit, such as by peeling off in the direction of the arrow P in FIG. 15, the fibrous structure can retain the general shape of pillows and knuckles that closely approximate the protuberances 18 and deflection conduits of the deflection member 10. Thus, as depicted in FIG. 15, the pillows 510 can have a pillow transition portion 512 having a pillow transition width PTW that corresponds to the minimum distance measure parallel to the X-Y plane between adjacent forming portions 12 of adjacent protuberances 18. Likewise the pillows 510 can have a pillow top portion 514 having a pillow top width PW, which is the minimum dimension measured between adjacent transition portions 24 of protuberances 18. The pillows 510 can have a pillow top height PH which closely approximates the transition portion 24 height TH and a pillow transition height which closely approximates the forming portion 26 height FH.

In general, therefore, the deflection member 10 of the present invention permits the manufacture of a fibrous structure having a plurality of regularly spaced relatively low density pillows extending from relatively high density knuckles, in which at least two of pillows are similar in size and shape, with the pillow having a pillow transition portion extending at a proximal end from the relatively high density knuckle, the pillow transition portion having a pillow transition portion width PTW; and a pillow top portion extending from a distal end of the pillow transition portion, the pillow top portion having a pillow top width PW.

The deflection member 10 of the present invention facilitates the manufacture of a fibrous structure in which the pillow transition portion width PTW can be less than the pillow top width PW. Therefore, the fibrous pillows 510 of the paper made on the deflection member 10 can have a density that is lower than the density of the rest of the fibrous structure 500, thus facilitating absorbency and softness of the fibrous structure 500, as a whole. The pillows 510 also contribute to increasing an overall surface area of the fibrous structure 500, thereby further encouraging the absorbency and softness thereof.

As with the deflection member 10 discussed above, there is a virtually infinite number of shapes, sizes, spacing and orientations that may be chosen for pillow 510 shapes and sizes. The actual shapes, sizes, orientations, and spacing of pillows are determined by the design of the deflection member and can be specified based on a desired structure of the fibrous structure. The improvement of the present invention is that the shapes, sizes, spacing, and orientations of the pillows 510 is not limited by the constraints of deflection members previously produced via UV-curing a resin through a patterned mask. That is, the size, shape and uniformity of the pillows 510 can be predetermined and achieved in a way not possible by the use of deflection members produced by essentially by "line of sight" UV-light curing. As discussed above, such line of sight light transmission prohibits effective curing of the forming portion 26 having a greater X-Y dimension than the transmission portion, particularly in a uniform manner for most or all of the protuberances.

In contrast to the "fibrous cantilever portions" taught in U.S. Pat. No. 6,660,129, that "laterally extend from the fibrous domes" at a second elevation, two or more of the pillows 510 of the present invention can be uniform in size and shape, and can be repeated in a uniform pattern across a fibrous structure. That is, rather than have a randomly distributed pattern of pillows that are not substantially identical or similar due to the constraints of mask design and placement, the pillows 510 of the present invention can be made uniformly the same throughout the deflection member. In an embodiment, at least two pillows 510 on the fibrous structure can be substantially identical in size and shape. By "substantially identical" is meant that the design intent is to have two or more pillows being identical in size and shape, but due to process limitations or irregularities there may be some slight differences. Two pillows that are the same shape and within 5% of each other in for the difference of pillow top width PW—Pillow transition width PTW are considered to be the substantially identical. Due to the fibrous nature of the pillows, the PW and PTW for a pillow of interest can be considered to be identical to the minimum dimension measured between adjacent transition portions 24 of protuberances 18 and the minimum dimension measured parallel to the X-Y plane between adjacent forming portions 12 of adjacent protuberances 18, respectively. That is, due to the molding properties of the deflection member 10, the dimensions of the fibrous structure made thereon can be considered to have dimensions corresponding to the deflection member void dimensions. In an embodiment, at least two pillows 510 on the fibrous structure 500 are of similar size and shape. By "similar" is meant that the design intent is that the two or more pillows have the same shape or size, but some variations may be present throughout the patterned framework.

Process for Making Fibrous Structure

Figure 16:
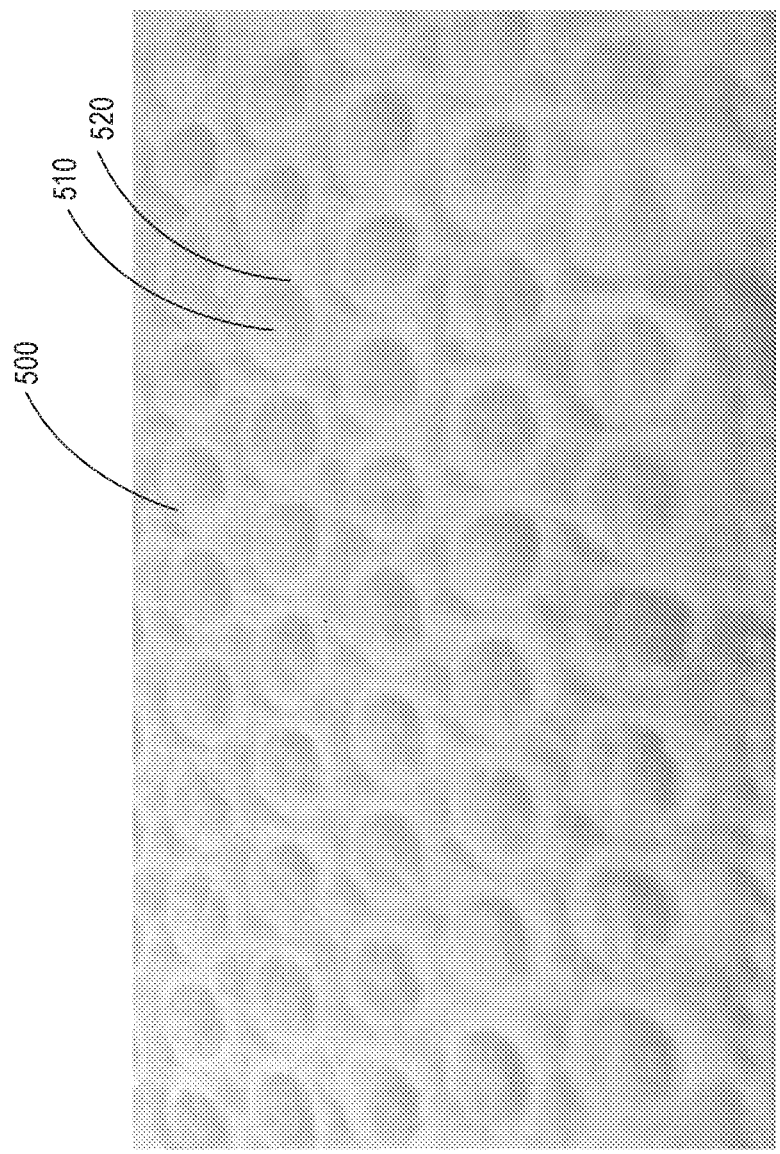
FIG. 16 is a photograph of a fibrous structure made according to the present invention.

With reference to FIG. 16, one exemplary embodiment of the process for producing the fibrous structure 500 of the present invention comprises the following steps. First, a plurality of fibers 501 is provided and is deposited on a forming wire of a papermaking machine, as is known in the art.

The present invention contemplates the use of a variety of fibers, such as, for example, cellulosic fibers, synthetic fibers, or any other suitable fibers, and any combination thereof. Papermaking fibers useful in the present invention include cellulosic fibers commonly known as wood pulp fibers. Fibers derived from soft woods (gymnosperms or coniferous trees) and hard woods (angiosperms or deciduous trees) are contemplated for use in this invention. The particular species of tree from which the fibers are derived is immaterial. The hardwood and softwood fibers can be blended, or alternatively, can be deposited in layers to provide a stratified web. U.S. Pat. No. 4,300,981 issued Nov. 17, 1981 to Carstens and U.S. Pat. No. 3,994,771 issued Nov. 30, 1976 to Morgan et al. are incorporated herein by reference for the purpose of disclosing layering of hardwood and softwood fibers.

The wood pulp fibers can be produced from the native wood by any convenient pulping process. Chemical processes such as sulfite, sulfate (including the Kraft) and soda processes are suitable. Mechanical processes such as thermomechanical (or Asplund) processes are also suitable. In addition, the various semi-chemical and chemi-mechanical processes can be used. Bleached as well as unbleached fibers are contemplated for use. When the fibrous web of this invention is intended for use in absorbent products such as paper towels, bleached northern softwood Kraft pulp fibers may be used. Wood pulps useful herein include chemical pulps such as Kraft, sulfite and sulfate pulps as well as mechanical pulps including for example, ground wood, thermomechanical pulps and Chemi-ThermoMechanical Pulp (CTMP). Pulps derived from both deciduous and coniferous trees can be used.

In addition to the various wood pulp fibers, other cellulosic fibers such as cotton linters, rayon, and bagasse can be used in this invention. Synthetic fibers, such as polymeric fibers, can also be used. Elastomeric polymers, polypropylene, polyethylene, polyester, polyolefin, and nylon, can be used. The polymeric fibers can be produced by spunbond processes, meltblown processes, and other suitable methods known in the art. It is believed that thin, long, and continuous fibers produces by spunbond and meltblown processes may be beneficially used in the fibrous structure of the present invention, because such fibers are believed to be easily deflectable into the pockets of the unitary deflection member of the present invention.

The paper furnish can comprise a variety of additives, including but not limited to fiber binder materials, such as wet strength binder materials, dry strength binder materials, and chemical softening compositions. Suitable wet strength binders include, but are not limited to, materials such as polyamide-epichlorohydrin resins sold under the trade name of KYMENE™ 557H by Hercules Inc., Wilmington, Del. Suitable temporary wet strength binders include but are not limited to synthetic polyacrylates. A suitable temporary wet strength binder is PAREZ™ 750 marketed by American Cyanamid of Stanford, Conn. Suitable dry strength binders include materials such as carboxymethyl cellulose and cationic polymers such as ACCO™ 711. The CYPRO/ACCO family of dry strength materials are available from CYTEC of Kalamazoo, Mich.

The paper furnish can comprise a debonding agent to inhibit formation of some fiber to fiber bonds as the web is dried. The debonding agent, in combination with the energy provided to the web by the dry creping process, results in a portion of the web being debulked. In one embodiment, the debonding agent can be applied to fibers forming an intermediate fiber layer positioned between two or more layers. The intermediate layer acts as a debonding layer between outer layers of fibers. The creping energy can therefore debulk a portion of the web along the debonding layer. Suitable debonding agents include chemical softening compositions such as those disclosed in U.S. Pat. No. 5,279,767 issued Jan. 18, 1994 to Phan et al., the disclosure of which is incorporated herein by reference Suitable biodegradable chemical softening compositions are disclosed in U.S. Pat. No. 5,312,522 issued May 17, 1994 to Phan et al. U.S. Pat. Nos. 5,279,767 and 5,312,522, the disclosures of which are incorporated herein by reference. Such chemical softening compositions can be used as debonding agents for inhibiting fiber to fiber bonding in one or more layers of the fibers making up the web. One suitable softener for providing debonding of fibers in one or more layers of fibers forming the web 20 is a papermaking additive comprising DiEster Di (Touch Hardened) Tallow Dimethyl Ammonium Chloride. A suitable softener is ADOGEN® brand papermaking additive available from Witco Company of Greenwich, Conn.

The embryonic web can be typically prepared from an aqueous dispersion of papermaking fibers, though dispersions in liquids other than water can be used. The fibers are dispersed in the carrier liquid to have a consistency of from about 0.1 to about 0.3 percent. Alternatively, and without being limited by theory, it is believed that the present invention is applicable to moist forming operations where the fibers are dispersed in a carrier liquid to have a consistency less than about 50 percent. In yet another alternative embodiment, and without being limited by theory, it is believed that the present invention is also applicable to airlaid structures, including air-laid webs comprising pulp fibers, synthetic fibers, and mixtures thereof.

Conventional papermaking fibers can be used and the aqueous dispersion can be formed in conventional ways. Conventional papermaking equipment and processes can be used to form the embryonic web on the Fourdrinier wire. The association of the embryonic web with the unitary deflection member can be accomplished by simple transfer of the web between two moving endless belts as assisted by differential fluid pressure. The fibers may be deflected into the unitary deflection member 10 by the application of differential fluid pressure induced by an applied vacuum. Any technique, such as the use of a Yankee drum dryer, can be used to dry the intermediate web. Foreshortening can be accomplished by any conventional technique such as creping.

The plurality of fibers can also be supplied in the form of a moistened fibrous web (not shown), which should preferably be in a condition in which portions of the web could be effectively deflected into the deflection conduits of the unitary deflection member and the void spaces formed between the suspended portions and the X-Y plane.

In FIG. 16, the embryonic web comprising fibers 501 is transferred from a forming wire 23 to a belt 21 on which a unitary deflection member 10 having an area dimension of approximately 8-12 square inches is disposed by placing it on the belt 21 upstream of a vacuum pick-up shoe 48a. Alternatively or additionally, a plurality of fibers, or fibrous slurry, can be deposited onto the unitary deflection member 10 directly (not shown) from a headbox or otherwise, including in a batch process. The papermaking belt comprising unitary deflection member 10 held between the embryonic web and the belt 21 travels past optional dryers/vacuum devices 48b and about rolls 19a, 19b, 19k, 19c, 19d, 19e, and 19f in the direction schematically indicated by the directional arrow "B."

A portion of the fibers 501 is deflected into the deflection portion of the unitary deflection member 10 such as to cause some of the deflected fibers or portions thereof to be disposed within the void spaces formed by the protuberances 18 of the unitary deflection member 10. Depending on the process, mechanical and fluid pressure differential, alone or in combination, can be utilized to deflect a portion of the fibers 501 into the deflection conduits of the unitary deflection member 10. For example, in a through-air drying process a vacuum apparatus 48c can apply a fluid pressure differential to the embryonic web disposed on the unitary deflection member 10, thereby deflecting fibers into the deflection conduits of the unitary deflection member 10. The process of deflection may be continued with additional vacuum pressure, if necessary, to even further deflect the fibers into the deflection conduits of the unitary deflection member 10.

Finally, a partly-formed fibrous structure associated with the unitary deflection member 10 can be separated from the unitary deflection member at roll 19k at the transfer to a Yankee dryer 128. By doing so, the unitary deflection member 10 having the fibers thereon is pressed against a pressing surface, such as, for example, a surface of a Yankee drying drum 128, thereby densifying generally high density knuckles 520, as shown in FIGS. 14 and 15. In some instances, those fibers that are disposed within the deflection conduits can also be at least partially densified.

After being creped off the Yankee dryer, a fibrous structure 500 of the present invention results and can be further processed or converted as desired.

Example

A unitary deflection member 10 of the present invention of the type shown in FIG. 5 is shown in FIGS. 11 and 12. FIG. 11 is a perspective view of a unitary deflection member, and FIG. 12 is a plan view of the same unitary deflection member.

As can be seen in FIGS. 11 and 12, the unitary deflection member has essentially the same shape as the digital image of FIG. 5. In the illustrated example, the unitary deflection member was produced using a MakerBot 3-D printer, as described above, as a unitary member comprising a pattern of solid torus-shape, or "donut" shapes, the donut shapes defining in their interior thirty-four discrete deflection conduits per square inch.

The cumulative projected open area ($\Sigma R$) of the deflection conduits was 0.565 square inches. The specific resulting open areas R1 and R2 (i. e., ratios of the cumulative projected open area of a given portions, i.e., the reinforcing member portion and the protrusions, to a given surface area) was computed to be: R=57%. The protrusions 18 have a forming member height FH of about 0.03 inches, and a forming member width FW (in this case, the width of the annular portion of the donut shape) of about 0.03 inches. The protrusions 18 have a transition width of about 0.0073 inches, and the outside of the donut in plan view has a diameter of about 0.01705 inches. The deflection member 10 has a deflection member height DMH of about 0.0775 inches. The protuberances 18 are situated on a 21×21 mesh reinforcing member 14 and are created simultaneously therewith as a unitary deflection member. The reinforcing member comprises a layer of spaced, rectangular cross section MD-oriented elements on which is situated a layer of spaced, rectangular cross section CD-oriented elements (to form the 21×21 mesh), each rectangular cross section element being 0.0145 inches wide (MD or CD, respectively) and 0.0220 inches high (Z-direction). The protuberances extend from the top of the CD-oriented elements.

Paper was produced using the unitary deflection member 10 as described in FIGS. 11 and 12 on a paper machine as described with reference to FIG. 16. The paper comprised 40% NSK (Northern Softwood Kraft), 10% SSK (Southern Softwood Kraft), 35% Fibria Eucalyptus (Hardwood Kraft) and 15% Broke. Each of the pulps were pulped using a conventional repulper. The NSK (Northern Softwood Kraft) and SSK (Southern Softwood Kraft) pulps were combined and pulped for 8 minutes at about 3.0% fiber by weight, then sent to stock chest "D". The Fibria Eucalyptus (Hardwood Kraft) was pulped for 3 minutes at about 3.0% fiber by weight, then sent to stock chest "B". The Broke was pulped for 8 minutes at about 3.0% fiber by weight, then sent to stock chest "A". The combined and homogeneous slurry of NSK and SSK pulp is passed through a refiner and is refined to a Canadian Standard Freeness (CSF) of about 300 to 500. Then, in order to impart wet strength, a strengthening additive (e.g., Kymene® 5221) is added to the combined NSK/SSK fiber mix stock pipe at a rate of about 21.0 lbs. per ton of total fiber. All of the fiber slurries are combined together then mixed in-line as a homogenous slurry and are then passed through a thick stock pipe. In order to impart additional dry strength, Finnfix/CMC® is added to the homogeneous thick stock slurry before entering the fan pump where it is diluted to about 0.15% to about 0.2% fiber by weight. Upon dilution, the homogeneous slurry is then directed to the headbox of a Fourdrinier paper machine forming section traveling at 888 feet per minute. The embryonic web is transferred from the forming wire (Microtex J76 design, Albany International) to the unitary deflection member 10 traveling at a speed of about 800 feet per minute with the aid of a vacuum pickup shoe set at about 12.4 inches of Hg.

The web was directly formed, vacuumed, and dried on the unitary deflection member 10 of the present invention. Once dried, the sheet was separated from the unitary deflection member 10. The uncreped web resulted in a conditioned basis weight of about 13.9 pound per 3000 feet square (at 2 hours at 70° F. and 50% RH).

Figure 17:
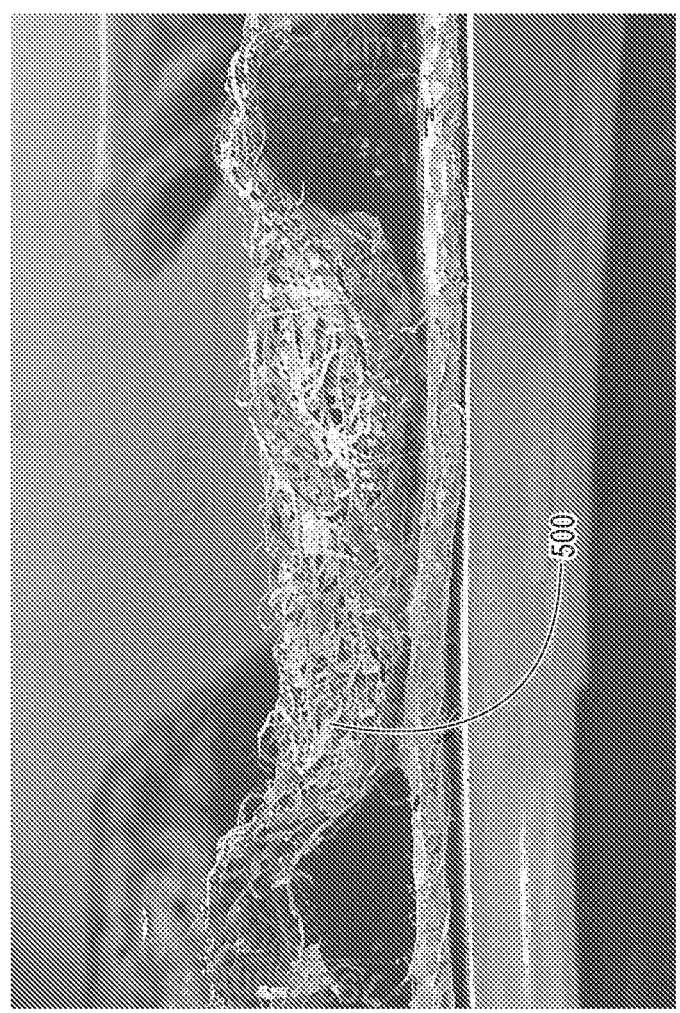
FIG. 17 is a photomicrograph of a cross section of the fibrous structure shown in FIG. 16.

The web formed is shown in FIGS. 17 and 18. FIG. 17 is a photograph of one surface of the fibrous structure 500 showing the topography imparted to the fibrous structure by the unitary deflection member. FIG. 18 is a photomicrograph of a cross section of the fibrous structure 500 shown in FIG. 17, and showing dimensions of one knuckle/pillow 510 portion of the fibrous structure 500.

What is claimed is:

1. A method for making a unitary deflection member that is utilized for making fibrous webs, the method comprising the steps of:
    a. providing an additive manufacturing making apparatus;
    b. providing at least one material for the unitary deflection member that is utilized for making fibrous webs, the material being compatible for use with the additive manufacturing making apparatus;
    c. generating a 3-D digital image of objects in a repeat element of the unitary deflection member, the objects including at least a reinforcing member comprising a first plurality MD-oriented elements along an MD axis and a second plurality of CD-oriented elements along a CD axis, the MD and CD-oriented elements being unitary with each other and also being unitary with a plurality of regularly spaced protuberances of the unitary deflection member, such that, in cross-section, the MD and CD-oriented elements and the plurality of protuberances are a single unit not formed from separate parts, wherein the regularly spaced protuberances extend from the reinforcing member in a Z direction and at least two of said protuberances are similar in size and shape, each said protuberance having a transition portion having a transition portion width and a forming portion having a forming portion width, and wherein the transition portion width is less than the forming portion width;
    d. assembling the objects into a digitized file including the at least one protuberance being on said reinforcing member;
    e. importing the digitized file to make a numerical control file of the additive manufacturing making apparatus; and
    f. depositing the material using the additive manufacturing making apparatus to make the unitary deflection member that is utilized for making fibrous webs.

2. The method for making a unitary deflection member of claim 1, wherein the additive manufacturing making apparatus is a 3-D printer.

3. The method for making a unitary deflection member of claim 1, wherein the digitized file describes a unitary deflection member having at least two of said protuberances are adjacent one another and separated by a void defining a deflection conduit.

4. The method for making a unitary deflection member of claim 1, wherein the digitized file describes a reinforcing member defining an X-Y plane, and a plurality of regularly spaced protuberances, wherein each protuberance has a three-dimensional shape such that any cross-sectional area of the protuberance parallel to the X-Y plane has an equal or lesser area than any cross-sectional area of the protuberance being a greater distance from the X-Y plane in the Z-direction.

5. The method for making a unitary deflection member of claim 4, wherein the plurality of regularly spaced protuberances are discrete units disposed in a regular, spaced apart configuration in both the MD and CD, each discrete unit having a cross-sectional shape, the cross-sectional shape being selected from key-hole-shaped, mushroom-shaped, circular, oval, inverted triangle, T-shaped, inverted L-shaped, egg- or pebble-shaped, and combinations thereof.

6. The method for making a unitary deflection member of claim 4, wherein the plurality of regularly spaced protuberances are disposed in a regular, spaced apart configuration of discrete units in the X-Y plane and distributed in both the MD and CD in a regular, spaced pattern.

7. A method for making a unitary deflection member that is utilized for making fibrous webs, the method comprising the steps of:
    a. providing an additive manufacturing making apparatus;
    b. providing at least one material for the unitary deflection member that is utilized for making fibrous webs, the material being compatible for use with the additive manufacturing making apparatus;
    c. generating a 3-D digital image of objects in an element of the unitary deflection member, the objects including at least a reinforcing member comprising a first plurality MD-oriented elements along an MD axis and a second plurality of CD-oriented elements along a CD axis, the MD and CD-oriented elements being unitary with each other and also being unitary with a plurality of regularly spaced protuberances of the unitary deflection member, such that, in cross-section, the MD and CD-oriented elements and the plurality of protuberances are a single unit not formed from separate parts, wherein the regularly spaced tuberances extend from the reinforcing member in a Z-direction and at least two of said protuberances are similar in size and shape, each said protuberance having a transition portion having a transition portion width and a forming portion having a forming portion width, and wherein the transition portion width is less than the forming portion width;
    d. assembling the objects into a digitized file including the at least one protuberance being on said reinforcing member;
    e. importing the digitized file to make a numerical control file of the additive manufacturing making apparatus; and
    f. depositing the material using the additive manufacturing making apparatus to make the unitary deflection member that is utilized for making fibrous webs.

8. The method for making a unitary deflection member of claim 7, wherein the additive manufacturing making apparatus is a 3-D printer.

9. The method for making a unitary deflection member of claim 7, wherein the digitized file describes a unitary deflection member having at least two of said protuberances are adjacent one another and separated by a void defining a deflection conduit.

10. The method for making a unitary deflection member of claim 7, wherein the digitized file describes a reinforcing member defining an X-Y plane, and a plurality of regularly spaced protuberances, wherein each protuberance has a three-dimensional shape such that any cross-sectional area of the protuberance parallel to the X-Y plane has an equal or lesser area than any cross-sectional area of the protuberance being a greater distance from the X-Y plane in the Z-direction.

11. The method for making a unitary deflection member of claim 10, wherein the plurality of regularly spaced protuberances are discrete units disposed in a regular, spaced apart configuration in both the MD and CD, each discrete unit having a cross-sectional shape, the cross-sectional shape being selected from key-hole-shaped, mushroom-shaped, circular, oval, inverted triangle, T-shaped, inverted L-shaped, egg- or pebble-shaped, and combinations thereof.

12. The method for making a unitary deflection member of claim 10, wherein the plurality of regularly spaced protuberances are disposed in a regular, spaced apart configuration of discrete units in the X-Y plane and distributed in both the MD and CD in a regular, spaced pattern.

13. A method for making a unitary deflection member that is utilized for making fibrous webs, the method comprising the steps of:
   a. providing 3-D printer apparatus;
   b. providing at least one material for the unitary deflection member that is utilized for making fibrous webs, the material being compatible for use with the additive manufacturing making apparatus;
   c. generating a 3-D digital image of objects in an element of the unitary deflection member, the objects including at least a reinforcing member comprising a first plurality MD-oriented elements along an MD axis and a second plurality of CD-oriented elements along a CD axis, the MD and CD-oriented elements being unitary with each other and also being unitary with a plurality of regularly spaced protuberances, such that, in cross-section, the MD and CD-oriented elements and the plurality of protuberances are a single unit not formed from separate parts, wherein the regularly spaced tuberances extend from the reinforcing member in a Z direction and at least two of said protuberances are similar in size and shape;
   d. assembling the objects into a digitized file including the at least one protuberance being on said reinforcing member;
   e. importing the digitized file to make a numerical control file of the additive manufacturing making apparatus; and
   f. depositing the material using the additive manufacturing making apparatus to make the unitary deflection member that is utilized for making fibrous webs.

14. The method for making a unitary deflection member of claim 13, wherein the digitized file describes a unitary deflection member having at least two of said protuberances are adjacent one another and separated by a void defining a deflection conduit.

15. The method for making a unitary deflection member of claim 13, wherein the digitized file describes a reinforcing member defining an X-Y plane, and a plurality of regularly spaced protuberances, wherein each protuberance has a three-dimensional shape such that any cross-sectional area of the protuberance parallel to the X-Y plane has an equal or lesser area than any cross-sectional area of the protuberance being a greater distance from the X-Y plane in the Z-direction.

16. The method for making a unitary deflection member of claim 13, wherein the plurality of regularly spaced protuberances are discrete units disposed in a regular, spaced apart configuration in both the MD and CD, each discrete unit having a cross-sectional shape, the cross-sectional shape being selected from key-hole-shaped, mushroom-shaped, circular, oval, inverted triangle, T-shaped, inverted L-shaped, egg- or pebble-shaped, and combinations thereof.

17. The method for making a unitary deflection member of claim 13, wherein the plurality of regularly spaced protuberances are disposed in a regular, spaced apart configuration of discrete units in the X-Y plane and distributed in both the MD and CD in a regular, spaced pattern.

* * * * *